United States Patent
Saunders et al.

(10) Patent No.: US 12,125,254 B2
(45) Date of Patent: *Oct. 22, 2024

(54) SYSTEM, METHOD, APPARATUS, AND COMPUTER PROGRAM PRODUCT FOR UTILIZING MACHINE LEARNING TO PROCESS AN IMAGE OF A MOBILE DEVICE TO DETERMINE A MOBILE DEVICE INTEGRITY STATUS

(71) Applicant: Assurant, Inc., New York, NY (US)

(72) Inventors: Stuart Saunders, Lakewood, OH (US); Anthony Coble, New York, NY (US); Nathan Breitsch, New York, NY (US); Mircea Ionescu, Wooster, OH (US)

(73) Assignee: Assurant, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,364

(22) Filed: May 17, 2023

(65) Prior Publication Data
US 2023/0360353 A1 Nov. 9, 2023

Related U.S. Application Data

(63) Continuation of application No. 17/022,322, filed on Sep. 16, 2020, now Pat. No. 11,704,887.
(Continued)

(51) Int. Cl.
*G06N 3/08* (2023.01)
*G06F 18/214* (2023.01)
(Continued)

(52) U.S. Cl.
CPC ............ *G06V 10/17* (2022.01); *G06F 18/214* (2023.01); *G06N 3/08* (2013.01); *G06T 15/30* (2013.01);
(Continued)

(58) Field of Classification Search
CPC .. G06F 2213/3806; G06F 21/31; G06F 11/00; G06T 2207/10004; G06T 1/0007;
(Continued)

(56) References Cited

U.S. PATENT DOCUMENTS

| 5,650,844 A | 7/1997 | Aoki et al. |
| 5,717,780 A | 2/1998 | Mitsumune et al. |

(Continued)

FOREIGN PATENT DOCUMENTS

| CA | 3016367 A1 | 9/2017 |
| EP | 3540690 A1 | 9/2019 |

(Continued)

OTHER PUBLICATIONS

Bian, Xiao et al., Multiscale Fully Convolutional Network with Application to Industrial Inspection, 2016 IEEE Winter Conference on Applications of Computer Vision (WACV), IEEE, Mar. 7, 2016, pp. 1-8.

(Continued)

*Primary Examiner* — Sumati Lefkowitz
*Assistant Examiner* — Michael Adam Shariff
(74) *Attorney, Agent, or Firm* — ALSTON & BIRD LLP

(57) ABSTRACT

A system, apparatus, method and computer program product are provided for determining a mobile device integrity status. Images of a mobile device captured by the mobile device and using a reflective surface are processed with various trained models, such as neural networks, to verify authenticity, detect damage, and to detect occlusions. A mask may be generated to enable identification of concave occlusions or blocked corners of an object, such as a mobile device, in an image. Images of the front and/or rear of a mobile device may be processed to determine the mobile device integrity status such as verified, not verified, or inconclusive. A user may be prompted to remove covers, (Continued)

remove occlusions, and/or move the mobile device closer to the reflective surface. A real-time response relating to the mobile device integrity status may be provided. The trained models may be trained to improve the accuracy of the mobile device integrity status.

30 Claims, 20 Drawing Sheets

Related U.S. Application Data

(60) Provisional application No. 62/900,775, filed on Sep. 16, 2019.

(51) Int. Cl.
*G06T 15/30* (2011.01)
*G06T 15/40* (2011.01)
*G06V 10/10* (2022.01)
*G06V 10/24* (2022.01)
*G06V 10/764* (2022.01)

(52) U.S. Cl.
CPC .............. *G06T 15/40* (2013.01); *G06V 10/24* (2022.01); *G06V 10/764* (2022.01)

(58) Field of Classification Search
CPC ......... G06T 3/4046; G06T 2207/20081; G06T 2207/20084; G06T 15/30; G06T 15/40; G06T 2207/20132; G06T 7/0002; G06T 7/0004; G06T 2207/30108; G06T 7/0008; G06T 7/11; G06T 7/13; G06T 2207/30121; G06V 10/17; G06V 20/95; G06V 10/25; H04N 5/2258; H04N 5/23222; H04N 5/23225; G06N 3/08; G06N 3/02; G06N 3/04; G06N 3/0454; G06K 9/6256; G06K 9/6267; G06Q 30/0278; G01N 21/88; G01N 21/8851; G01N 21/95; G01N 2021/8858; G01N 2021/8874; G01N 2021/8877; G01N 21/8806

See application file for complete search history.

(56) References Cited

U.S. PATENT DOCUMENTS

| | | | |
|---|---|---|---|
| 5,835,220 A | 11/1998 | Kazama et al. | |
| 5,914,495 A | 6/1999 | Ishizuka et al. | |
| 6,201,601 B1 | 3/2001 | Vaez-Iravani et al. | |
| 6,259,827 B1 | 7/2001 | Nichani | |
| 6,386,038 B1 | 5/2002 | Lewis et al. | |
| 6,597,805 B1 | 7/2003 | Nagao | |
| 6,781,688 B2 | 8/2004 | Kren et al. | |
| 7,206,066 B2 | 4/2007 | Vurens et al. | |
| 7,848,833 B2 | 12/2010 | Li et al. | |
| 8,822,922 B1 | 9/2014 | Scanlon et al. | |
| 8,867,817 B1 | 10/2014 | Cooper et al. | |
| 8,964,062 B1 | 2/2015 | Neglur | |
| 9,007,581 B2 | 4/2015 | Horai et al. | |
| 9,134,892 B2 | 9/2015 | Hicks | |
| 9,369,865 B2 | 6/2016 | Hsu et al. | |
| 9,703,325 B2 | 7/2017 | Pope et al. | |
| 10,001,878 B2 | 6/2018 | Wood et al. | |
| 10,007,934 B2 | 6/2018 | Nguyen | |
| 10,332,249 B2 | 6/2019 | Dwivedi et al. | |
| 10,402,790 B1* | 9/2019 | Clark | G06Q 20/0425 |
| 10,810,732 B2 | 10/2020 | Dwivedi et al. | |
| 11,210,777 B2* | 12/2021 | Fitzgerald | G01N 21/95 |
| 2002/0009220 A1 | 1/2002 | Tanaka | |
| 2002/0128790 A1 | 9/2002 | Woodmansee | |
| 2004/0125208 A1 | 7/2004 | Malone et al. | |
| 2004/0207836 A1 | 10/2004 | Chhibber et al. | |
| 2005/0146719 A1 | 7/2005 | Chhibber et al. | |
| 2005/0167620 A1 | 8/2005 | Cho et al. | |
| 2005/0193027 A1 | 9/2005 | Hasegawa et al. | |
| 2006/0007177 A1 | 1/2006 | McLintock | |
| 2006/0120588 A1 | 6/2006 | Kwon et al. | |
| 2007/0205751 A1 | 9/2007 | Suzuki et al. | |
| 2007/0289673 A1 | 12/2007 | Lacroix et al. | |
| 2010/0053604 A1 | 3/2010 | Rice | |
| 2010/0169231 A1 | 7/2010 | Bowles et al. | |
| 2010/0228676 A1 | 9/2010 | Librizzi et al. | |
| 2011/0043798 A1 | 2/2011 | Markwort et al. | |
| 2012/0029947 A1 | 2/2012 | Wooldridge et al. | |
| 2012/0280934 A1 | 11/2012 | Ha et al. | |
| 2013/0046611 A1 | 2/2013 | Bowles et al. | |
| 2013/0046699 A1 | 2/2013 | Bowles et al. | |
| 2013/0121463 A1 | 5/2013 | Nesch et al. | |
| 2013/0124426 A1 | 5/2013 | Bowles et al. | |
| 2013/0144797 A1 | 6/2013 | Bowles et al. | |
| 2013/0154842 A1 | 6/2013 | Chishima | |
| 2013/0162548 A1 | 6/2013 | Chen et al. | |
| 2013/0191236 A1 | 7/2013 | Bowles | |
| 2013/0198089 A1 | 8/2013 | Bowles | |
| 2013/0269013 A1 | 10/2013 | Parry et al. | |
| 2013/0311318 A1 | 11/2013 | Librizzi et al. | |
| 2014/0253494 A1 | 9/2014 | Jiang et al. | |
| 2014/0254862 A1 | 9/2014 | Sobczak et al. | |
| 2014/0267691 A1 | 9/2014 | Humphrey et al. | |
| 2014/0313144 A1 | 10/2014 | Seto et al. | |
| 2015/0046343 A1 | 2/2015 | Martini | |
| 2015/0116481 A1 | 4/2015 | Troy et al. | |
| 2015/0123987 A1 | 5/2015 | Hong et al. | |
| 2015/0206200 A1 | 7/2015 | Edmondson et al. | |
| 2015/0309912 A1 | 10/2015 | Nguyen et al. | |
| 2015/0324926 A1 | 11/2015 | Nguyen et al. | |
| 2015/0330910 A1 | 11/2015 | Nguyen et al. | |
| 2015/0339736 A1 | 11/2015 | Bennett | |
| 2016/0019685 A1 | 1/2016 | Nguyen | |
| 2016/0055778 A1 | 2/2016 | Kim | |
| 2016/0225036 A1 | 8/2016 | Nguyen | |
| 2016/0307309 A1 | 10/2016 | Nguyen et al. | |
| 2017/0023637 A1 | 1/2017 | Yang et al. | |
| 2017/0056928 A1 | 3/2017 | Torrione | |
| 2017/0091557 A1 | 3/2017 | Wong et al. | |
| 2017/0167986 A1 | 6/2017 | Nguyen et al. | |
| 2017/0195069 A1 | 7/2017 | Slavin | |
| 2017/0256051 A1 | 9/2017 | Dwivedi et al. | |
| 2017/0315007 A1 | 11/2017 | Fitzgerald et al. | |
| 2017/0344884 A1 | 11/2017 | Lin et al. | |
| 2018/0342050 A1 | 11/2018 | Fitzgerald et al. | |
| 2019/0266720 A1* | 8/2019 | Dwivedi | G06T 7/0004 |
| 2019/0277769 A1 | 9/2019 | Nguyen et al. | |
| 2020/0167907 A1 | 5/2020 | Yan et al. | |
| 2020/0202369 A1* | 6/2020 | Datta | G06V 40/176 |

FOREIGN PATENT DOCUMENTS

| | | |
|---|---|---|
| EP | 3427198 B1 | 7/2020 |
| EP | 3731157 A1 | 10/2020 |
| ES | 2819699 T3 | 4/2021 |
| ES | 2820230 T3 | 4/2021 |
| JP | H01-112382 A | 5/1989 |
| JP | 2004-251781 A | 9/2004 |
| JP | 2009-032112 A | 2/2009 |
| JP | 2010-066186 A | 3/2010 |
| JP | 2012-090231 A | 5/2012 |
| JP | 2013-114049 A | 6/2013 |
| JP | 2013-531823 A | 8/2013 |
| JP | 2015-513135 A | 4/2015 |
| JP | 2019-114146 | 7/2019 |
| JP | 2020-126661 A | 8/2020 |
| JP | 6754843 B2 | 9/2020 |
| WO | 2013/116256 A1 | 8/2013 |
| WO | 2017/156046 A1 | 9/2017 |

OTHER PUBLICATIONS

Communication about intention to grant a European patent received for EP Application No. 20176606.0, mailed on Nov. 8, 2021, 6 pages.

(56) References Cited

OTHER PUBLICATIONS

Decision to grant a European patent received for European Application No. 20176606.0, mailed on Mar. 31, 2022, 2 pages.
Du-Ming Tsai et al., Low-contrast surface inspection of mura defects in liquid crystal displays using optical flow-based motion analysis, Machine Vision and Applications, Springer, Berlin, DE vol. 22, No. 4, Mar. 31, 2010 (Mar. 31, 2020), pp. 629-649, XP019917678, ISSN: 1432-1759, DOI: 10.1007/S00138-010-0256-1.
English Translation of JP Office Action dated Mar. 22, 2023 for JP Application No. 2021135016, 7 page(s).
European Search Report and Search Opinion Received for EP Application No. 20176606.0, mailed on Sep. 28, 2020, 5 pages.
European Search Report and Search Opinion received for EP Application No. 22163056.9, mailed on Jun. 27, 2022, 7 pages.
Examination Report in related Canadian Application No. 3016367 dated Jul. 12, 2019 (4 pages).
Extended European Search Report for EP Application No. 22163056.9 (7 pages), Jun. 27, 2022.
International Preliminary Report on Patentability received for PCT Patent Application No. PCT/US17/21223, mailed on Sep. 20, 2018, 8 pages.
International Preliminary Report Patentability for PCT/US2020/051046.
International Search Report and Written Opinion received for PCT Patent Application No. PCT/US17/21223, mailed on Jul. 14, 2017, 10 pages.
ISA/EP, International Search Report and Written Opinion for PCT/US2020/051046 mailed Mar. 11, 2021 (16 pages).
JP Office Action Mailed on Mar. 22, 2023 for JP Application No. 2021135016, 5 page(s).
JPO, Office Action for JP Application No. 2021-135016 issued Oct. 11, 2022.
Malaysia Patent Office, Malaysia applicaiton No. PI 2018001472 Substantive Examination and Search Report, Sep. 30, 2021.
Yuan Lunxi et al., The Development and Prospect of Surface Defect Detection Based on Vision Measurement Method, 2016 12th World Congress on Intelligent Control and Automation (WCICA), IEEE, Jun. 12, 2016, pp. 1382-1387.
Zhang Lei et al., Road Crack Detection Using Deep Convolutional Neural Network, 2016 IEEE International Conference on Image Processing (ICIP), IEEE, Sep. 25, 2016, pp. 3708-3712.
U.S. Appl. No. 17/022,322, filed Sep. 16, 2020, U.S. Pat. No. 11,704,887, Issued.
English Translation of JP Office Action dated Oct. 11, 2022 for JP Application No. 2021135016, 6 page(s).
CA Office Action Mailed on Nov. 29, 2023 for CA Application No. 3151157, 9 page(s).
IN Office Action Mailed on Feb. 5, 2024 for IN Application No. 202217022321, 8 page(s).
English Translation of JP Office Action dated Mar. 26, 2024 for JP Application No. 2022516288, 8 page(s).
JP Office Action Mailed on Mar. 26, 2024 for JP Application No. 2022516288, 8 page(s).

\* cited by examiner

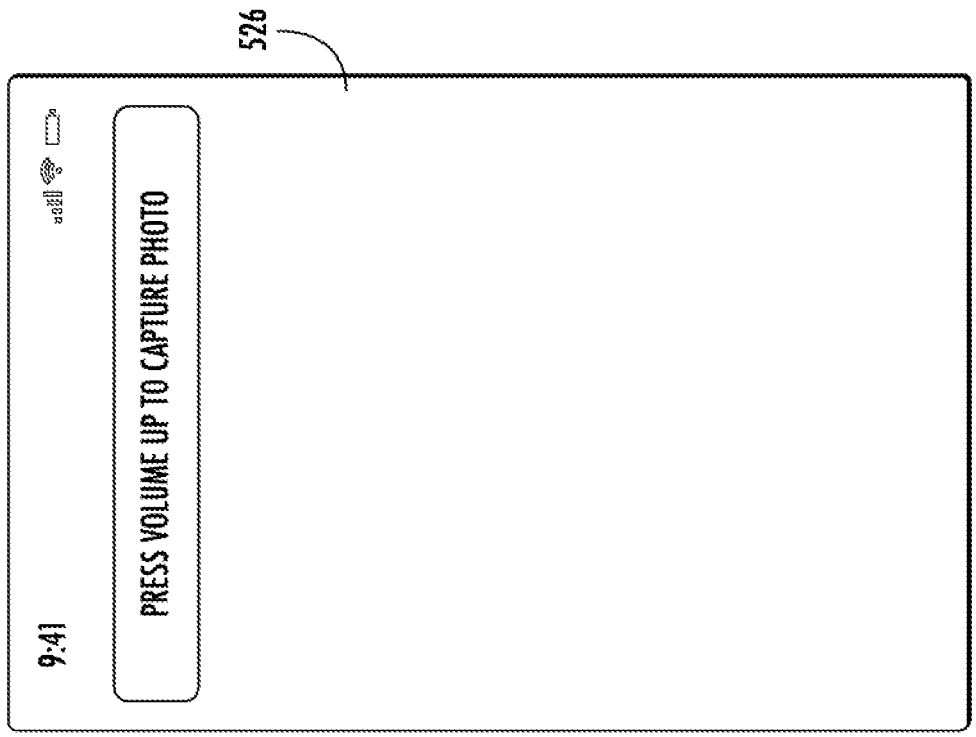
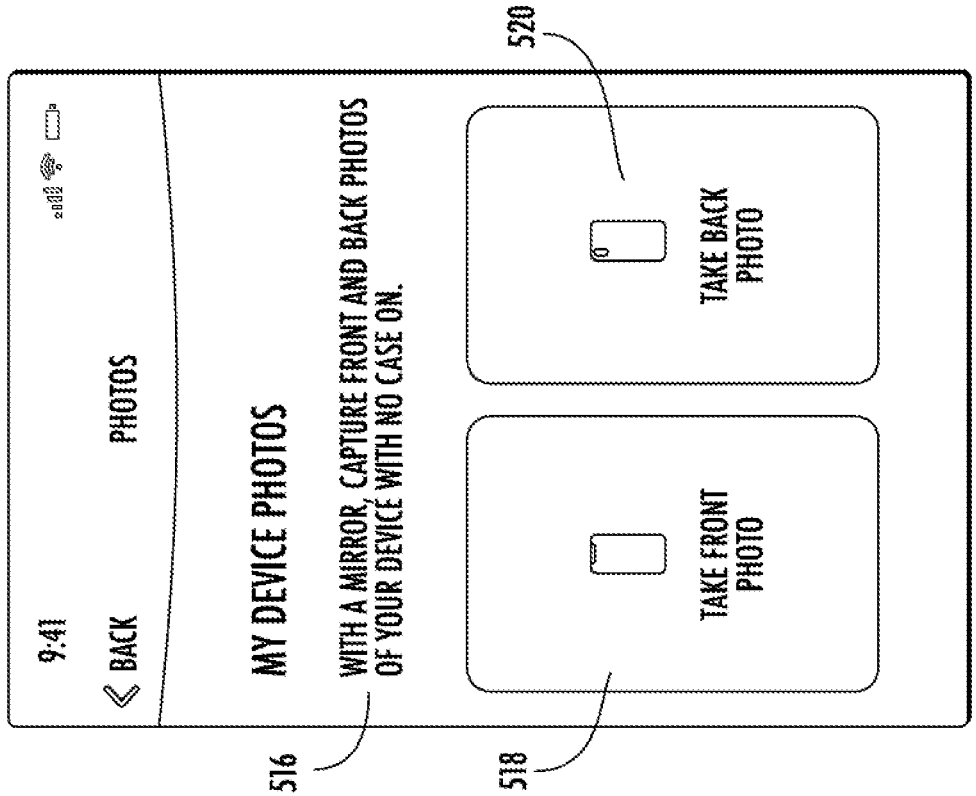
FIG. 5E
FIG. 5F

SYSTEM, METHOD, APPARATUS, AND COMPUTER PROGRAM PRODUCT FOR UTILIZING MACHINE LEARNING TO PROCESS AN IMAGE OF A MOBILE DEVICE TO DETERMINE A MOBILE DEVICE INTEGRITY STATUS

CROSS REFERENCE TO RELATED APPLICATION

This application is a continuation of and claims priority to U.S. application Ser. No. 17/022,322, filed Sep. 16, 2020, which claims priority to U.S. Provisional Application No. 62/900,775, filed Sep. 16, 2019, and titled, "System, Method, Apparatus, and Computer Program Product for Determining a Mobile Device Integrity Status and for Detecting Occlusions in an Image," the entire contents of which are hereby incorporated by reference in their entireties.

TECHNOLOGICAL FIELD

Embodiments of the present invention relate generally to computer technology and, more particularly, relate to a system, method, apparatus, and computer program product utilizing machine learning to train and utilize a mathematical model(s) such as a predictive model(s), neural network(s), and/or the like to determine a mobile device integrity status based on electronic processing of images.

BACKGROUND

Computer vision enables computers to see and understand an image. In some instances, computer vision may be used to detect and analyze the content of an image, such as recognizing an object within an image. However, existing technology is inadequate to meet the speed and precision requirements of many industries, and there is a need for improvement in computer vision techniques and technology to enable sophisticated image processing. Moreover, human analysis is incapable of the speed and precision required for computer vision tasks. Through applied effort, ingenuity, and innovation, many of these identified problems have been solved by developing solutions that are included in embodiments of the present invention, many examples of which are described in detail herein.

BRIEF SUMMARY OF EXAMPLE EMBODIMENTS

Systems, methods, apparatuses and computer program products are therefore provided for utilizing machine learning to train and utilize a model to determine a mobile device integrity status based on electronic processing of images.

In some use cases, a system must review images of an object to verify the integrity of the object (e.g., to determine information about the object, to verify the operability or functionality of the object, to verify the identity of the object, or the like). The computer vision and image processing must occur rapidly and with a high-degree of precision, which is lacking in many conventional image processing techniques. A further challenge may be when the system cannot select the imaging device that captures the image and cannot control the image capture process directly, and thus, the computer vision must be sufficiently robust to account for and/or detect issues with the capture process. In an example working environment, a system may seek to verify the identity and integrity of an object using only an image of the object (e.g., a mobile device) or using an image in combination with one or more data objects transmitted from the object or from another device. An example of such an environment may be when a user registers for a service, protection plan, or the like, which requires a remote system to verify the object (e.g., a mobile device) without having the device physically present. According to some processes for purchasing aftermarket coverage, a consumer must visit a retailer, insurance provider, or mobile device service provider to have the device inspected and to verify the integrity of the device before the insurer will issue the policy and enroll the device for coverage. Other processes for purchasing and/or selling coverage allow a consumer to utilize a self-service web application or mobile application to take photographs of their mobile device and submit the images for manual review prior to enrollment. However, such processes require review time and may delay the confirmation of coverage to the consumer. Such processes may further expose the provider to fraud, such as when the consumer submits a photo of a different, undamaged mobile device and tries to obtain coverage for a previously damaged device.

An additional implementation provides a time-sensitive bar code, quick response (QR) code, or other computer-generated code to be displayed by the device, and captured in a photo using a mirror, thereby linking the photo submission to the device that displayed the code. However, such implementations may be susceptible to fraud, such as by enabling a user to recreate the code on another undamaged device and to capture a photo of the undamaged device. Still further, the code implementation may only provide for validation of the front (e.g., display side) of the device without reliably verifying the condition or status of the rear of the device and/or bezel of the device. Another drawback of such implementations is that when a code is displayed on a device display, it may obscure cracks or other damages present on the screen.

Example embodiments of the present disclosure provide for improved determination of mobile device integrity status. Example embodiments may prompt a user to capture images of their device in a mirror or other reflective surface using a sensor or camera of the device itself. Identifying information of the mobile device may be processed along with the images to confirm the images were indeed taken of the subject device from which the images were captured, and to confirm the device has no pre-existing damage that disqualifies the device from coverage.

Example embodiments may utilize machine learning algorithms and an associated mathematical model(s), such as but not limited to, a neural network(s), such as a convolutional neural network and/or the like, predictive model(s) and/or other type of "model(s)," as may be referenced herein, that may be trained to analyze and identify pertinent information from the images by using training images that are manually reviewed and labelled and/or characterized by a user. It will be appreciated that any reference herein to "model" may include any type of model that may be used with a machine learning algorithm to be trained with training images and make predictions regarding certain features of other images. Example embodiments may utilize the trained model(s) to utilize the information detected in subsequently received images to predict features in the images, such as but not limited to a mobile device integrity status.

Different models, each of which may be trained with different training sets, may be used to make different types of predictions. Utilizing the trained model(s) (e.g., neural network) may allow certain example embodiments to determine the mobile device integrity status in real-time or near real-time from when the images are submitted, (according to some embodiments, without additional human review), and/or to forward in real-time or near real-time, inconclusive or high-risk predictions for further review prior to finalizing the mobile device integrity status and/or enrolling the mobile device in a protection plan. In some embodiments, the output of one or more models may be taken as the input into a subsequent model for more sophisticated analysis of the image and determination of the mobile device integrity status.

In some example environments, consumers may purchase insurance plans, warranties, extended warranties and/or other device protection plans to protect their mobile devices and smart phones from damage, theft, loss and/or the like. In some instances, a consumer may purchase such a plan at the point of sale, such that the condition of the device is known to be new and qualifies the device for coverage. However, in some cases, a consumer may wish to purchase protection after the device has been in their possession, either directly from an insurance provider, or through their mobile device service provider. The provider must be able to quickly verify the integrity of the device without physical access to the device or the ability to directly operate the device. In such instances, manual screening is incapable of meeting the precision and speed required to verify the integrity of the device in a reasonable time, and there may be a need for the systems, methods, and apparatus described herein. Similarly, consumers who purchase used or refurbished devices may wish to purchase insurance aftermarket, when the condition of the device is unknown to the insurance provider. The insurance provider confirms the condition of the device at the time the protection is purchased, to minimize loss and prevent fraudulent purchases of protection for devices with existing damage.

It will be appreciated that reference made herein to warranty, extended warranty, insurance, insurance policy, policy, coverage, device protection plan, protection plan, and/or the like, are not intended to limit the scope of the disclosure, and that example embodiments may relate to the enrollment of mobile devices in any such aforementioned plan or similar plan to protect a mobile device against loss or may relate to other environments using the computer vision and image processing systems, methods, and apparatus described herein. Similarly, any references to verifying the integrity of the device may relate to qualification of the mobile device for enrollment in any of the aforementioned plans or environments. Still further, determination of the mobile device integrity status may be used for other purposes.

One example condition implemented according to example embodiments described herein includes determining whether occlusions are present in an image of a mobile device. It will be appreciated that the occlusion detection process disclosed herein may be utilized for other purposes, such as determining occlusions of any type of object in an image.

A method is provided, including receiving a device integrity verification request associated with a mobile device, and receiving mobile device identifying data objects comprising information describing the mobile device. The method further includes causing display on the mobile device of a prompt to capture at least one image of the mobile device using one or more image sensors of the mobile device and a reflective surface, and receiving the at least one image captured by the one or more image sensors mobile device. The method may further include, with at least one trained model, processing the at least one image to determine a mobile device integrity status. In certain embodiments, the at least one trained model may include a neural network.

According to certain example embodiments, processing the at least one image to determine a mobile device integrity status includes determining whether the at least one image includes the mobile device associated with the mobile device identifying data object. Determining whether the at least one image includes the mobile device comprises identifying a suspected mobile device in the at least one image, generating a prediction of an identity of the at least one suspected mobile device, and comparing the mobile device identifying data objects to the prediction of the identity of the at least one suspected mobile device to determine whether the suspected mobile device is the mobile device. Processing the at least one image to determine a mobile device integrity status may further include, in an instance in which the suspected mobile device is determined to be the mobile device, determining a mobile device integrity status as verified. Processing the at least one image to determine a mobile device integrity status may further include, if the mobile device integrity status is determined as inconclusive, transmitting the device integrity verification request and the at least one image to an internal user apparatus for internal review.

According to some embodiments, processing the at least one image to determine mobile device integrity status may include utilizing the at least one trained model to determine whether there is damage to the mobile device, and in response to determining there is damage to the mobile device, determining a mobile device integrity status as not verified.

In some embodiments, processing the at least one image to determine mobile device integrity status includes determining an angle of the mobile device relative to the reflective surface when the at least one image was captured, and determining, based on the angle, that the at least one images includes a different mobile device than the mobile device associated with the mobile device identifying data object. Processing the at least one image to determine mobile device integrity status includes may further include, in response to determining based on the angle, that the at least one images captures a different mobile device, causing display on the mobile device of a message instructing the user to recapture the mobile device; and determining that the mobile device integrity status is not verified.

According to some embodiments, processing the at least one image to determine mobile device integrity status may include determining a location within the at least one image of the mobile device, wherein the location is defined as a bounding box, and in an instance the bounding box has a first predefined relationship with a threshold ratio of the at least one image, causing display on the mobile device of a message indicating to move the mobile device closer to the reflective surface. In an instance the bounding box has a second predefined relationship with the threshold ratio of the at least one image, the processing the at least one image to determine mobile device integrity status may include may further include cropping the at least one image according to the bounding box.

According to some embodiments, processing the at least one image to determine mobile device integrity status includes determining, using the at least one trained model, that an object occludes the mobile device in the at least one image, and causing display on the mobile device of a prompt to capture images without the occlusion. Determining whether there are occlusions of the mobile device in the at least one image may include determining whether there are concave occlusions in the at least one image, and determining whether there are any corners blocked in the at least one image. Determining whether there are concave occlusions in the at least one image may include with the at least one trained model, generating a mobile device mask comprising a reduced number of colors relative to the at least one image, extracting a polygonal subregion P of the mobile device mask, determining a convex hull of P, and computing a difference between P and the convex hull, eliminating or reducing thin discrepancies at least one edge of P and the convex hull, identifying a largest area of remaining regions of P, and comparing the largest area to a threshold to determine whether the at least one image includes concave occlusions.

According to some embodiments, determining whether there are any corners blocked in the at least one image may include with the at least one trained model, generating a mobile device mask comprising a reduced number of colors relative to the at least one image, extracting a polygonal subregion P of the mobile device mask, determining a convex hull of P, identifying four dominant edges of the convex hull, determining intersections of adjacent dominant edges to identify corners, determining respective distances of each corner to P, and comparing each distance to a distance threshold to determine if any corners are blocked in the at least one image.

According to certain embodiments, processing the at least one image to determine a mobile device integrity status includes determining with the at least one trained model, whether the at least one image includes a front of the mobile device, a back of the mobile device, or a cover.

In response to receiving the at least one image, certain example embodiments may provide in real-time or near real-time, a response for display on the mobile device, wherein the response provided is dependent on the determined mobile device integrity status.

Example embodiments may also include causing display on the mobile device of a test pattern configured to provide improved accuracy in predicting a characteristic of the at least one image captured when the mobile device displays the test pattern, relative to an accuracy in predicting the characteristic of the at least one image captured when the mobile device displays another pattern of display.

Some example embodiments may identify a subset of conditions to be satisfied in order to determine a mobile device integrity status as verified, in an instance all the conditions in the subset of conditions are satisfied in a particular image, setting an image status of the particular image to verified, and in an instance respective image statuses for all required images are verified, determining the mobile device integrity status as verified. In some embodiments, at least one of the conditions of the subset of conditions to be satisfied is performed on the mobile device.

According to certain embodiments, receiving the at least one image comprises receiving at least two images captured by the mobile device, wherein a first image of the at least two images is of a front side of the device, and a second image of the at least two images is of the rear side of the device, and wherein processing the at least one image to determine a mobile device integrity status comprises, with the at least one trained model, processing both the first image and the second image. and in an instance the processing of both images results in respective image statuses of verified, determining the determine mobile device integrity status as verified.

Some embodiments may train the at least one trained model by inputting training images and respective labels describing a characteristic of the respective training image.

A method is also provided for detecting concave occlusions in an image, the method comprising with at least one trained model, generating a mask comprising a reduced number of colors relative to the image, extracting a polygonal subregion P of the mask, determining a convex hull of P, and computing a difference between P and the convex hull. The method further includes eliminating or reducing thin discrepancies at least one edge of P and the convex hull, recalculating P as the largest area of remaining regions, and determining concavities as the difference between P and the convex hull.

A method is provided for detecting blocked corners of an object in an image, the method comprising, with at least one trained model, generating a mask comprising a reduced number of colors relative to the image, extracting a polygonal subregion P of the mask, determining a convex hull of P, identifying a predetermined number of dominant edges of the convex hull, determining intersections of adjacent dominant edges to identify corners, determining respective distances of each corner to P, and comparing each distance to a distance threshold to determine if any corners are blocked in the image.

An apparatus is provided, the apparatus comprising at least one processor and at least one memory including computer program code, the at least one memory and the computer program code configured to, with the processor, cause the apparatus to at least receive a device integrity verification request associated with a mobile device, and receive mobile device identifying data objects comprising information describing the mobile device. The at least one memory and the computer program code may be further configured to, with the processor, cause the apparatus to cause display on the mobile device of a prompt to capture at least one image of the mobile device using one or more image sensors of the mobile device and a reflective surface, and receive the at least one image captured by the one or more image sensors mobile device. The at least one memory and the computer program code may be further configured to, with the processor, and with at least one trained model, process the at least one image to determine a mobile device integrity status.

An apparatus is provided for detecting concave occlusions in an image, the apparatus comprising at least one processor and at least one memory including computer program code, the at least one memory and the computer program code configured to, with the processor, cause the apparatus to at least with at least one trained model, generate a mask comprising a reduced number of colors relative to the image, extract a polygonal subregion P of the mask, determine a convex hull of P, compute a difference between P and the convex hull, eliminate or reducing thin discrepancies at least one edge of P and the convex hull, recalculate P as the largest area of remaining regions, and determine concavities as the difference between P and the convex hull.

An apparatus is also provided for detecting blocked corners of an object in an image, the apparatus comprising at least one processor and at least one memory including computer program code, the at least one memory and the computer program code configured to, with the processor, cause the apparatus to at least, with at least one trained model, generate a mask comprising a reduced number of colors relative to the image, extract a polygonal subregion P of the mask, determine a convex hull of P, identify a predetermined number of dominant edges of the convex hull, determine intersections of adjacent dominant edges to identify corners, determine respective distances of each corner to P, and compare each distance to a distance threshold to determine if any corners are blocked in the image.

A computer program product is provided, the computer program product comprising at least one non-transitory computer-readable storage medium having computer-executable program code instructions stored therein, the computer-executable program code instructions comprising program code instructions to receive a device integrity verification request associated with a mobile device, receive mobile device identifying data objects comprising information describing the mobile device, cause display on the mobile device of a prompt to capture at least one image of the mobile device using one or more image sensors of the mobile device and a reflective surface, receive the at least one image captured by the one or more image sensors mobile device, and with at least one trained model, process the at least one image to determine a mobile device integrity status.

A computer program product is also provided for detecting concave occlusions in an image, the computer program product comprising at least one non-transitory computer-readable storage medium having computer-executable program code instructions stored therein, the computer-executable program code instructions comprising program code instructions to with at least one trained model, generate a mask comprising a reduced number of colors relative to the image, extract a polygonal subregion P of the mask, determine a convex hull of P compute a difference between P and the convex hull, eliminate or reducing thin discrepancies at least one edge of P and the convex hull, recalculate P as the largest area of remaining regions, and determine concavities as the difference between P and the convex hull.

A computer program product is also provided for detecting blocked corners of an object in an image, the computer program product comprising at least one non-transitory computer-readable storage medium having computer-executable program code instructions stored therein, the computer-executable program code instructions comprising program code instructions to with at least one trained model, generate a mask comprising a reduced number of colors relative to the image, extract a polygonal subregion P of the mask, determine a convex hull of P, identify a predetermined number of dominant edges of the convex hull, determine intersections of adjacent dominant edges to identify corners, determine respective distances of each corner to P, and compare each distance to a distance threshold to determine if any corners are blocked in the image.

An apparatus is provided, the apparatus comprising means for receiving a device integrity verification request associated with a mobile device, and means for receiving mobile device identifying data objects comprising information describing the mobile device, means for causing display on the mobile device of a prompt to capture at least one image of the mobile device using one or more image sensors of the mobile device and a reflective surface, means for receiving the at least one image captured by the one or more image sensors mobile device, and means for, with at least one trained model, processing the at least one image to determine a mobile device integrity status.

An apparatus is provided having means for detecting concave occlusions in an image, the apparatus comprising means for causing the apparatus to generate, using at least one trained model, a mask comprising a reduced number of colors relative to the image, extract a polygonal subregion P of the mask, means for determining a convex hull of P, compute a difference between P and the convex hull, means for eliminating or reducing thin discrepancies at least one edge of P and the convex hull, means for recalculating P as the largest area of remaining regions, and means for determining concavities as the difference between P and the convex hull.

An apparatus is also provided with means for detecting blocked corners of an object in an image, the apparatus including means for, with at least one trained model, generating a mask comprising a reduced number of colors relative to the image, means for extracting a polygonal subregion P of the mask, means for determining a convex hull of P, identify a predetermined number of dominant edges of the convex hull, means for determining intersections of adjacent dominant edges to identify corners, means for determining respective distances of each corner to P, and means for comparing each distance to a distance threshold to determine if any corners are blocked in the image.

According to certain embodiments, a method is provided including receiving an indication of a subject image, and processing the subject image with at least one trained model, such as a model (e.g., neural network), that can be used with a machine learning algorithm. The model is trained with a plurality of training images that are each labeled as either including a mobile device or excluding a mobile device, to determine whether the subject image includes a mobile device.

According to certain embodiments, a method is provided including receiving an indication of a subject image, and processing the subject image with at least one trained model, trained with a plurality of training images that are each associated with a bounding box indicating a location of a mobile device in the image, to determine a location of a mobile device in the subject image. The method may further include cropping the subject image based on the determined location of the mobile device in the subject image.

According to certain embodiments, a method is provided including receiving an indication of a subject image of a subject mobile device, processing the subject image of the mobile device with at least one trained model, trained with a plurality of training images of mobile devices labeled as including a cover on the respective mobile device or excluding a cover on the respective mobile device, to determine whether the subject image includes a cover on the subject mobile device.

According to certain embodiments, a method is provided including receiving an indication of a subject image of a subject mobile device, and processing the subject image of the mobile device with at least one trained model, trained with a plurality of training images of mobile devices, each training image labeled as including a front side of the respective mobile device or including a rear side of the respective mobile device, to determine whether the subject image includes a front side or rear side of the subject mobile device.

According to certain embodiments, a method is provided including receiving an indication of a subject image of a subject mobile device, and processing the subject image of the mobile device with at least one trained model, trained with a plurality of training images of mobile devices, each training image labeled as having been captured by the respective mobile device included in the image, or captured by a different device than the respective mobile device included in the image, to determine whether the subject mobile device included in the subject image was captured by the subject mobile device or a different device.

According to certain embodiments, a method is provided including receiving an indication of a subject image of a subject mobile device, and processing the subject image of the mobile device with at least one trained model, trained with a plurality of training images of mobile devices, each training image labeled with a damage rating, to calculate a damage rating of the subject mobile device in the subject image.

According to certain embodiments, an apparatus comprising at least one processor and at least one memory including computer program code, the at least one memory and the computer program code configured to, with the processor, cause the apparatus to at least receive an indication of a subject image, and process the subject image with at least one trained model, trained with a plurality of training images that are each labeled as either including a mobile device or excluding a mobile device, to determine whether the subject image includes a mobile device.

An apparatus is also provides that includes at least one processor and at least one memory including computer program code, the at least one memory and the computer program code configured to, with the processor, cause the apparatus to at least receive an indication of a subject image, process the subject image with at least one trained model, trained with a plurality of training images that are each associated with a bounding box indicating a location of a mobile device in the image, to determine a location of a mobile device in the subject image, and crop the subject image based on the determined location of the mobile device in the subject image.

According to certain embodiments, an apparatus is provided comprising at least one processor and at least one memory including computer program code, the at least one memory and the computer program code configured to, with the processor, cause the apparatus to at least receive an indication of a subject image of a subject mobile device, and process the subject image of the mobile device with at least one trained model, trained with a plurality of training images of mobile devices labeled as including a cover on the respective mobile device or excluding a cover on the respective mobile device, to determine whether the subject image includes a cover on the subject mobile device.

An apparatus is also provided that includes at least one processor and at least one memory including computer program code, the at least one memory and the computer program code configured to, with the processor, cause the apparatus to at least receive an indication of a subject image of a subject mobile device, and process the subject image of the mobile device with at least one trained model, trained with a plurality of training images of mobile devices, each training image labeled as including a front side of the respective mobile device or including a rear side of the respective mobile device, to determine whether the subject image includes a front side or rear side of the subject mobile device.

According to certain embodiments, an apparatus comprising at least one processor and at least one memory including computer program code, the at least one memory and the computer program code configured to, with the processor, cause the apparatus to at least receive an indication of a subject image of a subject mobile device, and process the subject image of the mobile device with at least one trained model, trained with a plurality of training images of mobile devices, each training image labeled as having been captured by the respective mobile device included in the image, or captured by a different device than the respective mobile device included in the image, to determine whether the subject mobile device included in the subject image was captured by the subject mobile device or a different device.

An apparatus is also provided comprising at least one processor and at least one memory including computer program code, the at least one memory and the computer program code configured to, with the processor, cause the apparatus to at least receive an indication of a subject image of a subject mobile device, and process the subject image of the mobile device with at least one trained model, trained with a plurality of training images of mobile devices, each training image labeled with a damage rating, to calculate a damage rating of the subject mobile device in the subject image.

According to example embodiments, a computer program product is provides that includes at least one non-transitory computer-readable storage medium having computer-executable program code instructions stored therein, the computer-executable program code instructions comprising program code instructions to receive an indication of a subject image, and process the subject image with at least one trained model, trained with a plurality of training images that are each labeled as either including a mobile device or excluding a mobile device, to determine whether the subject image includes a mobile device.

A computer program product is also provided including at least one non-transitory computer-readable storage medium having computer-executable program code instructions stored therein, the computer-executable program code instructions comprising program code instructions to receive an indication of a subject image, and process the subject image with at least one trained model, trained with a plurality of training images that are each associated with a bounding box indicating a location of a mobile device in the image, to determine a location of a mobile device in the subject image. The computer-executable program code instructions comprising program code instructions to crop the subject image based on the determined location of the mobile device in the subject image.

A computer program product is also provided comprising at least one non-transitory computer-readable storage medium having computer-executable program code instructions stored therein, the computer-executable program code instructions comprising program code instructions to receive an indication of a subject image of a subject mobile device, and process the subject image of the mobile device with at least one trained model, trained with a plurality of training images of mobile devices labeled as including a cover on the respective mobile device or excluding a cover on the respective mobile device, to determine whether the subject image includes a cover on the subject mobile device.

According to certain embodiments, a computer program product is provided comprising at least one non-transitory computer-readable storage medium having computer-executable program code instructions stored therein, the computer-executable program code instructions comprising program code instructions to receive an indication of a subject image of a subject mobile device, and process the subject image of the mobile device with at least one trained model, trained with a plurality of training images of mobile devices, each training image labeled as including a front side of the respective mobile device or including a rear side of the respective mobile device, to determine whether the subject image includes a front side or rear side of the subject mobile device.

A computer program product is provided that includes at least one non-transitory computer-readable storage medium having computer-executable program code instructions stored therein, the computer-executable program code instructions comprising program code instructions to receive an indication of a subject image of a subject mobile device, and process the subject image of the mobile device with at least one trained model, trained with a plurality of training images of mobile devices, each training image labeled as having been captured by the respective mobile device included in the image, or captured by a different device than the respective mobile device included in the image, to determine whether the subject mobile device included in the subject image was captured by the subject mobile device or a different device.

A computer program product is also provided comprising at least one non-transitory computer-readable storage medium having computer-executable program code instructions stored therein, the computer-executable program code instructions comprising program code instructions to receive an indication of a subject image of a subject mobile device, and process the subject image of the mobile device with at least one trained model, trained with a plurality of training images of mobile devices, each training image labeled with a damage rating, to calculate a damage rating of the subject mobile device in the subject image.

The models and algorithms discussed herein may be used independently, for their own intended purpose, or may be used in one or more larger processes, such as those discussed herein. For example, in some embodiments, both a rear and forward camera image may be taken of a rear and front of a device, and the various trained models discussed herein may be run for each image either separately or as part of a larger process to ensure that a device is intact and undamaged. In some embodiments, one or more of the models and algorithms may be run as part of an onboarding process for a protection product and/or service contract or other device protection program for which verification of the integrity of the device is required.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
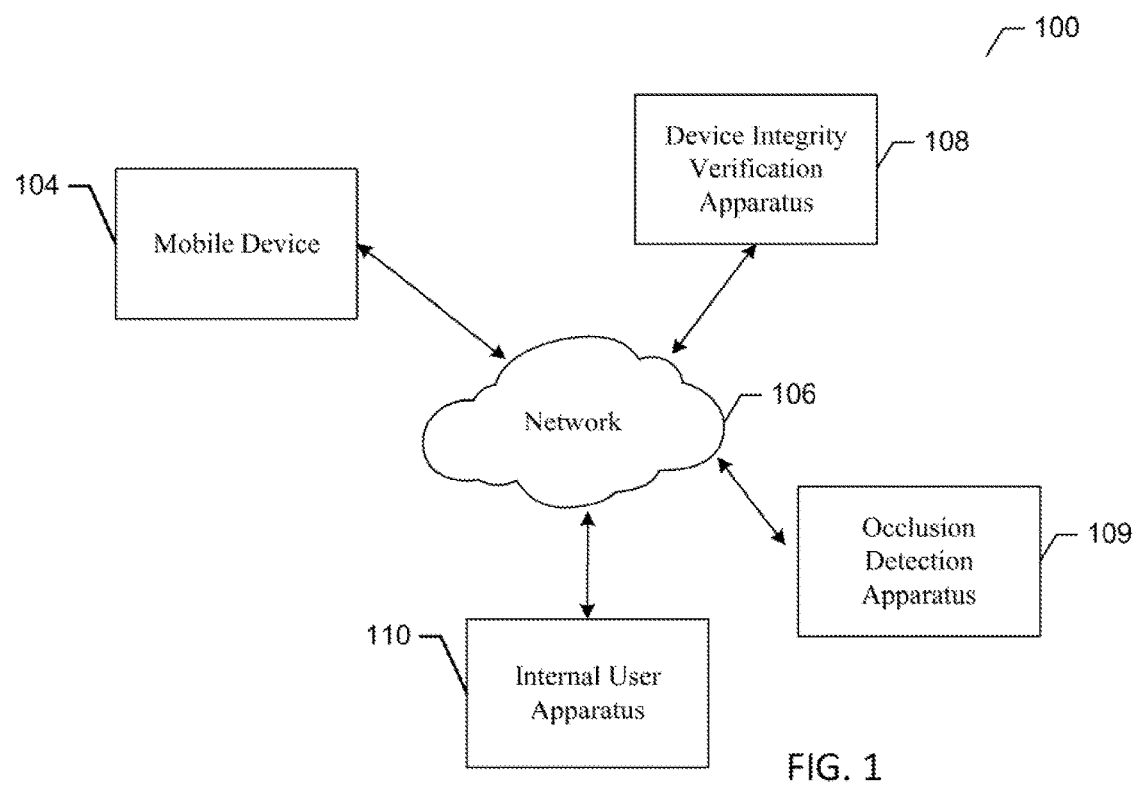
Figure 2:
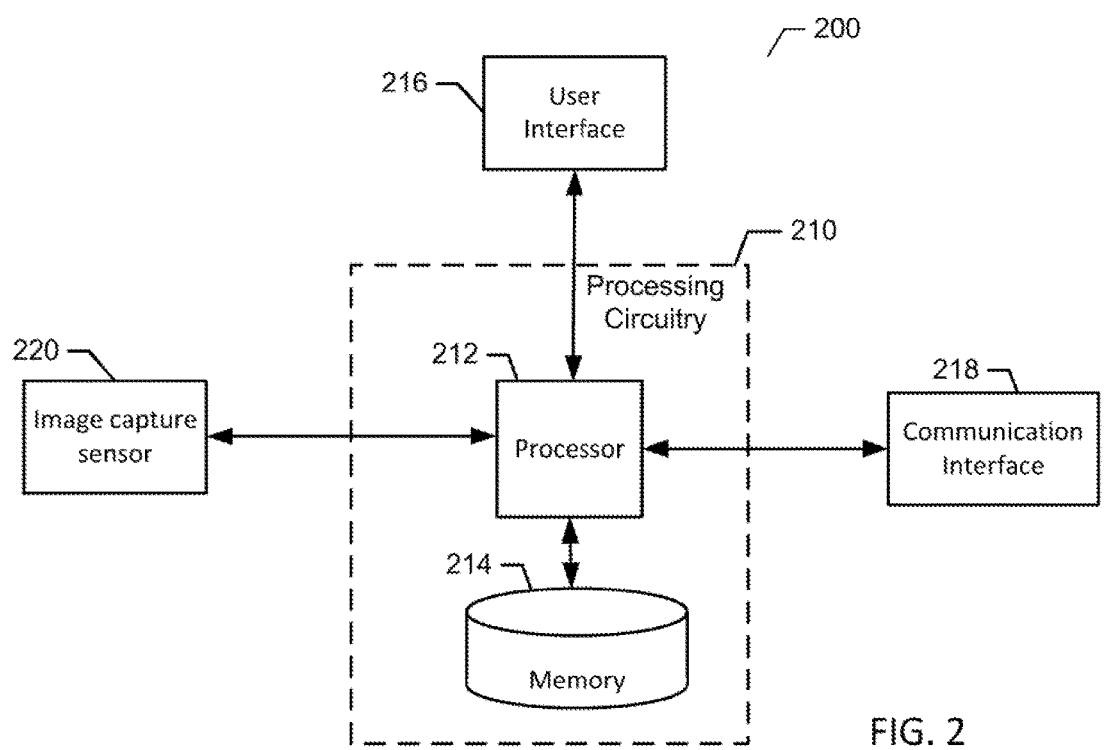
Figure 3:
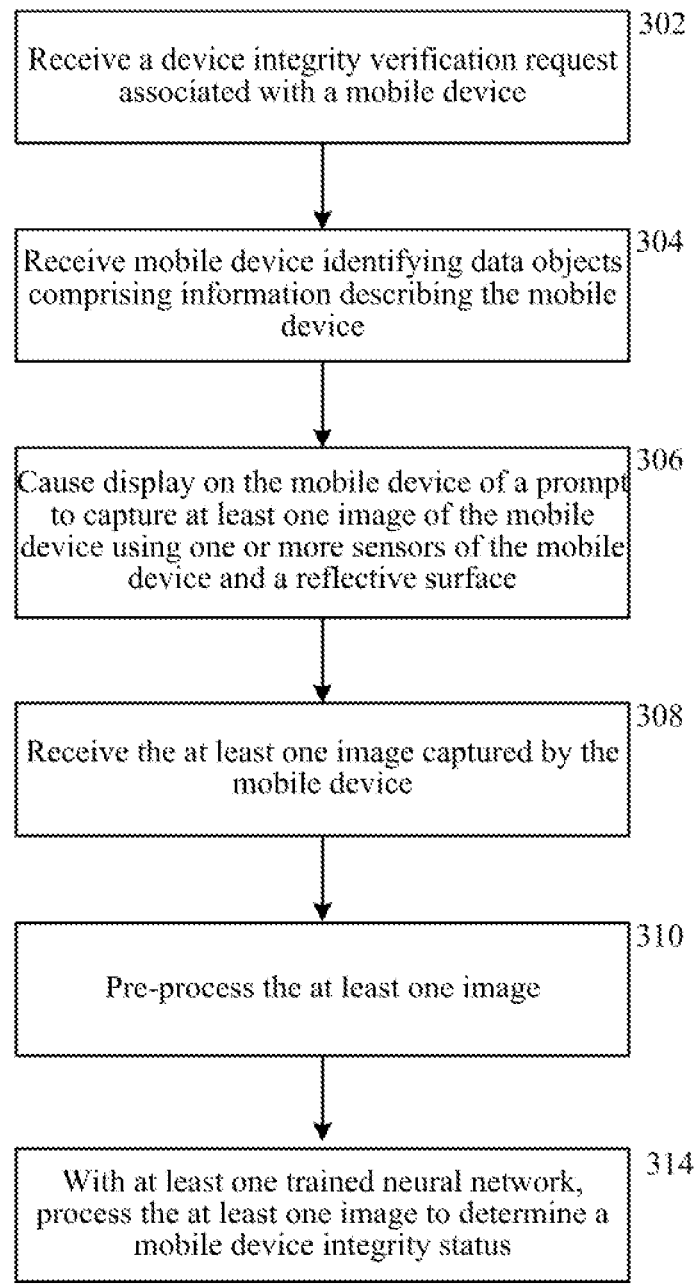
Figure 4A:
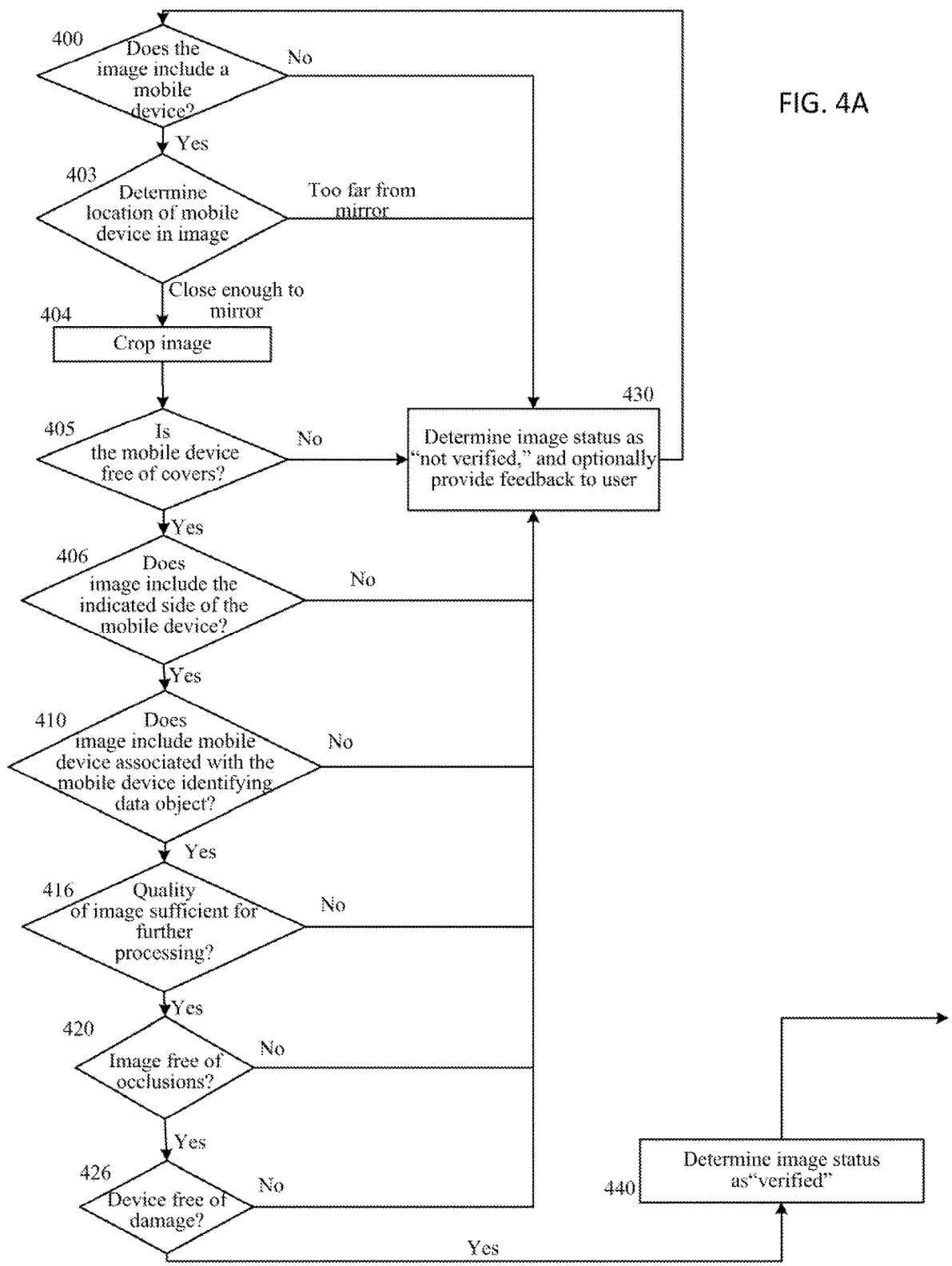
Figure 4B:
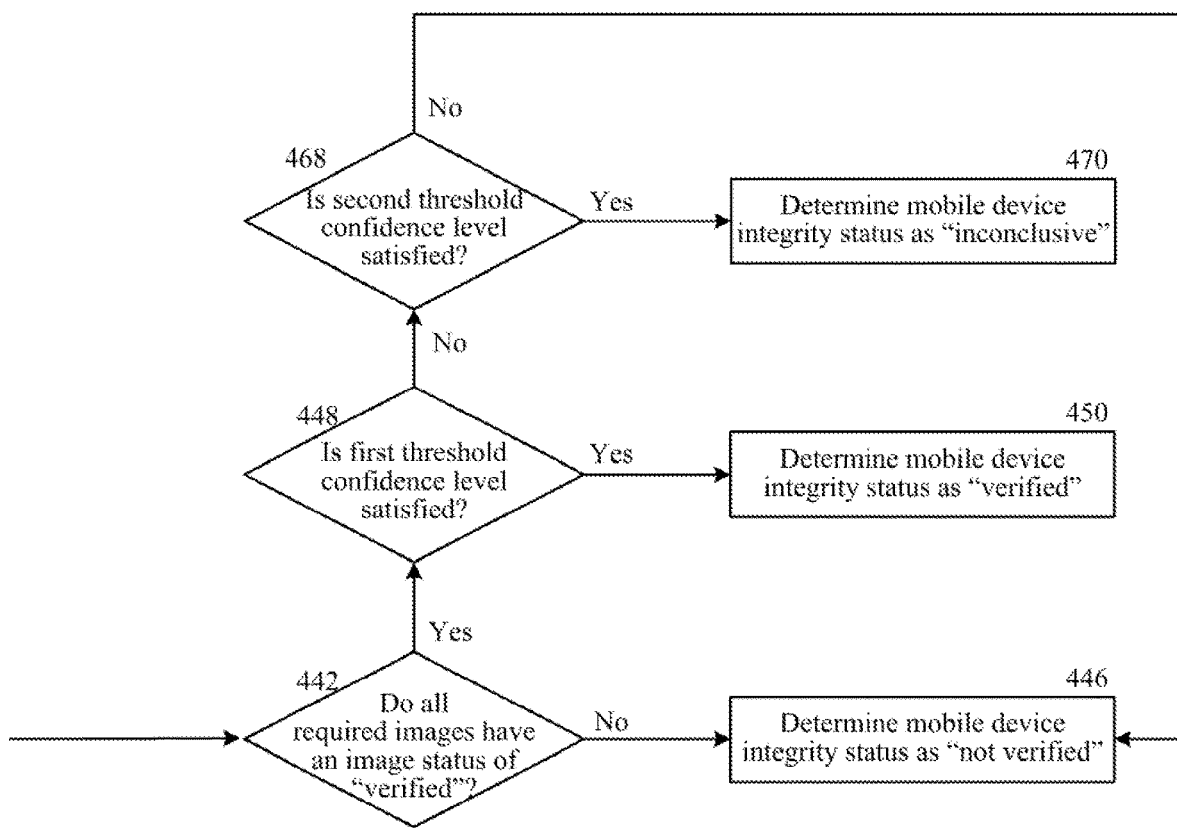
Figure 4C:
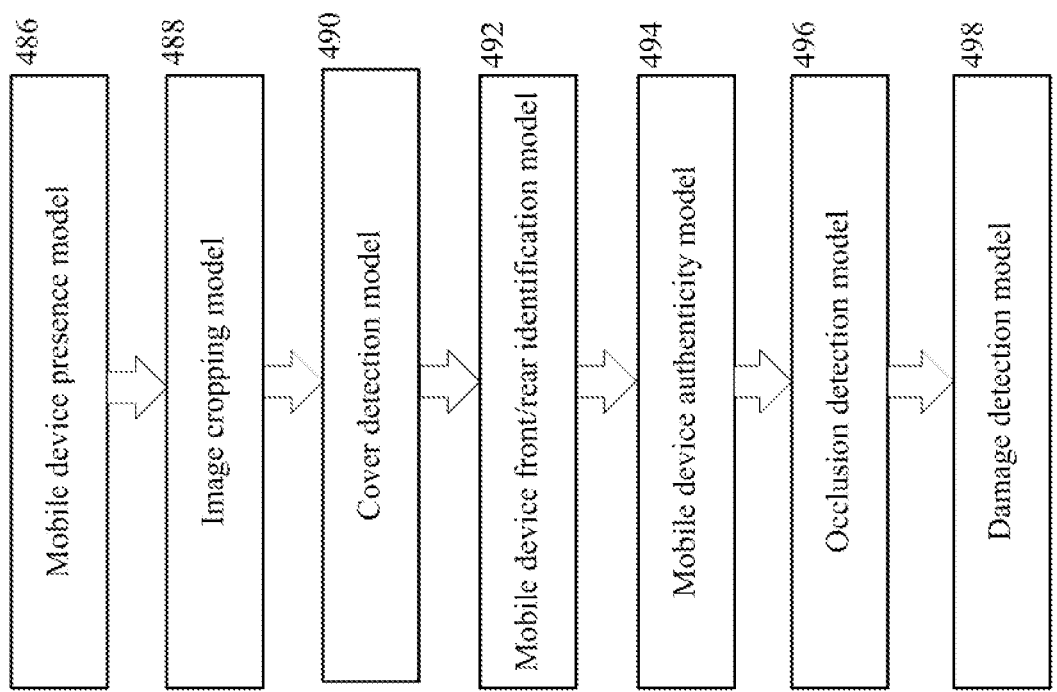
Figure 5B:
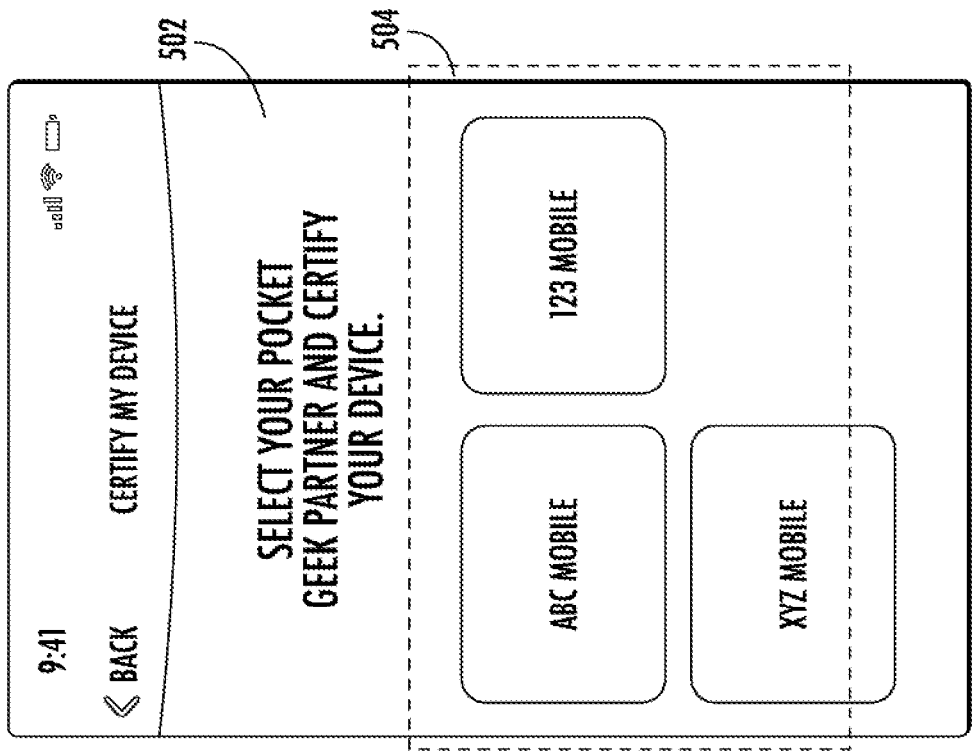
Figure 5A:
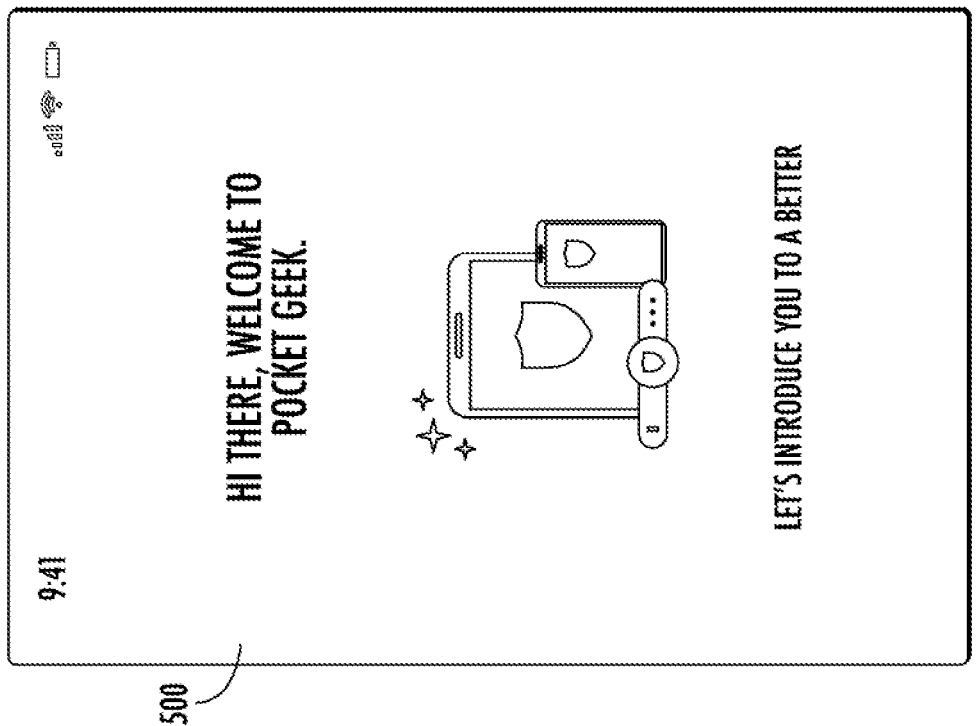
Figure 5D:
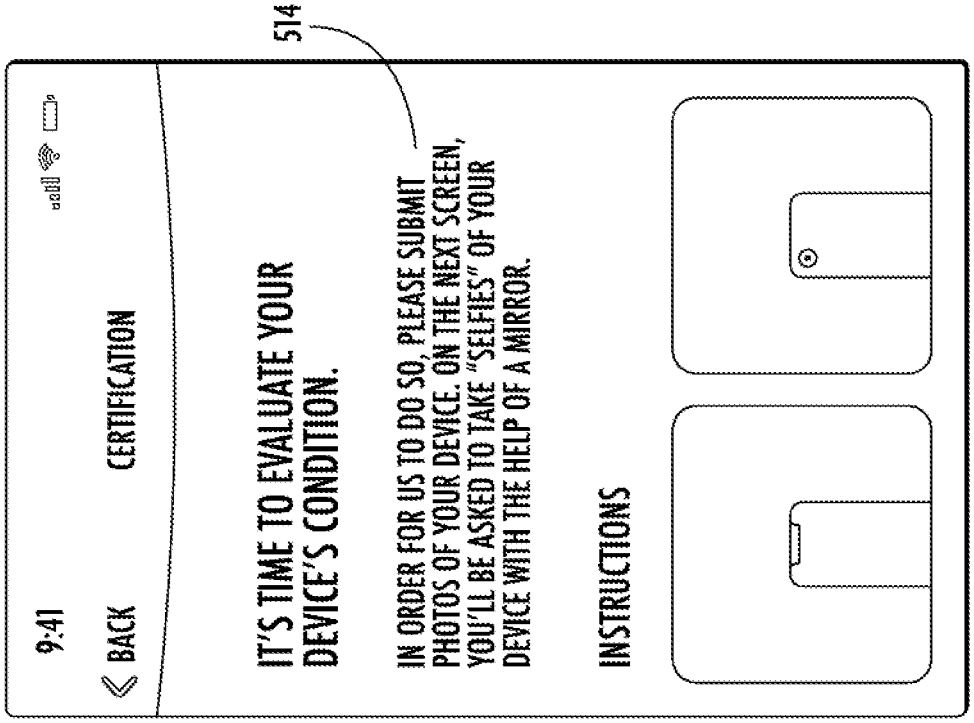
Figure 5C:
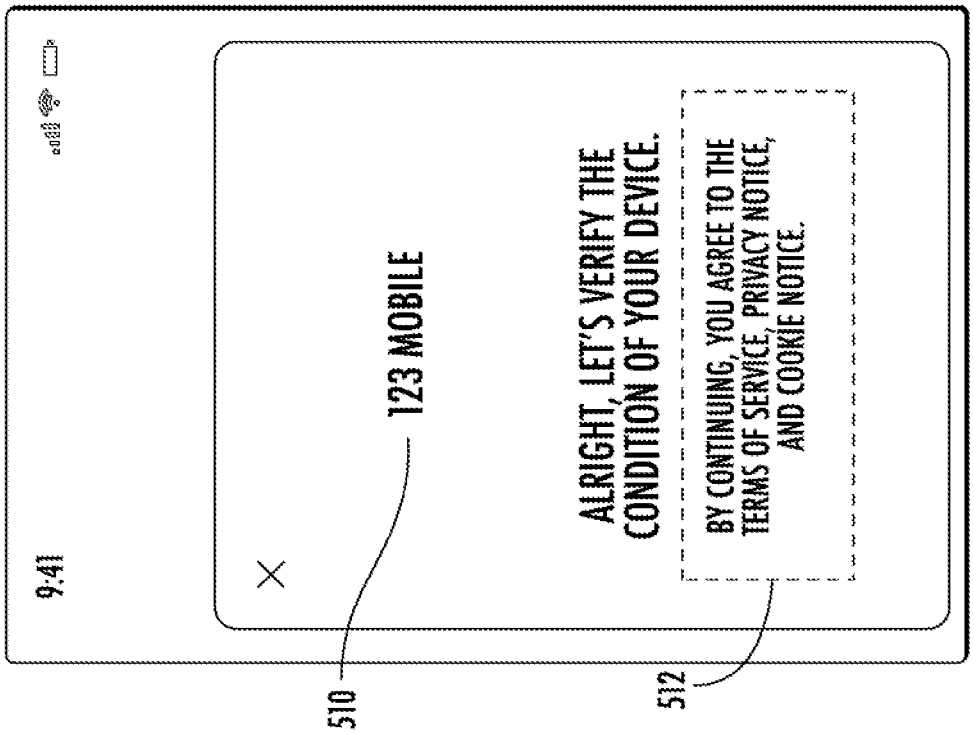
Figure 5H:
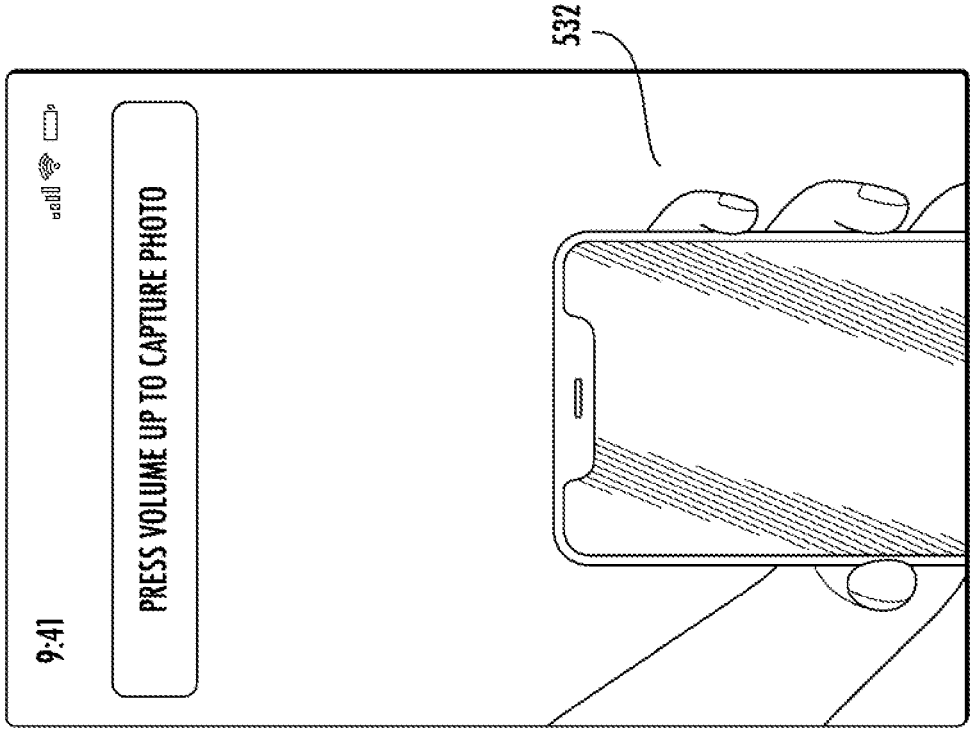
Figure 5G:
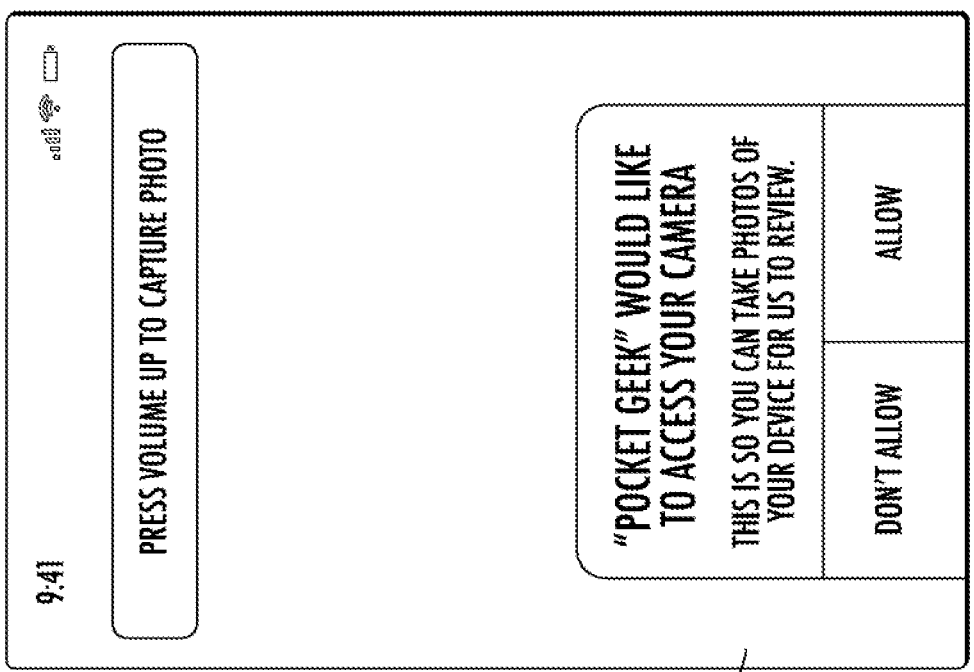
Figure 5I:
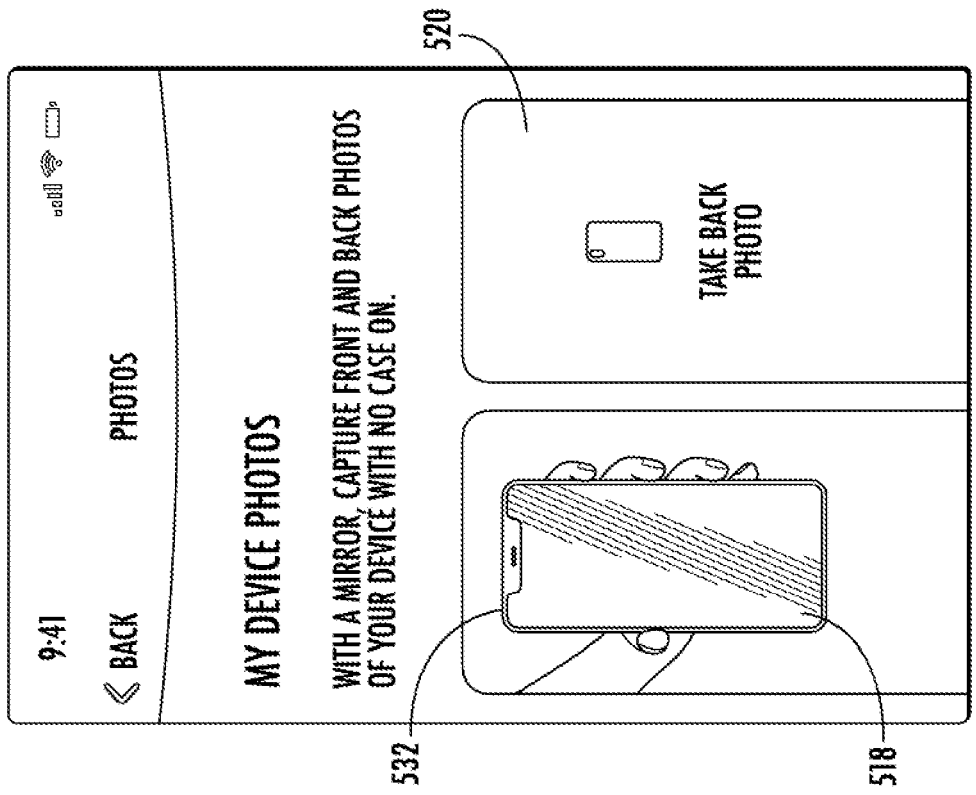
Figure 5J:
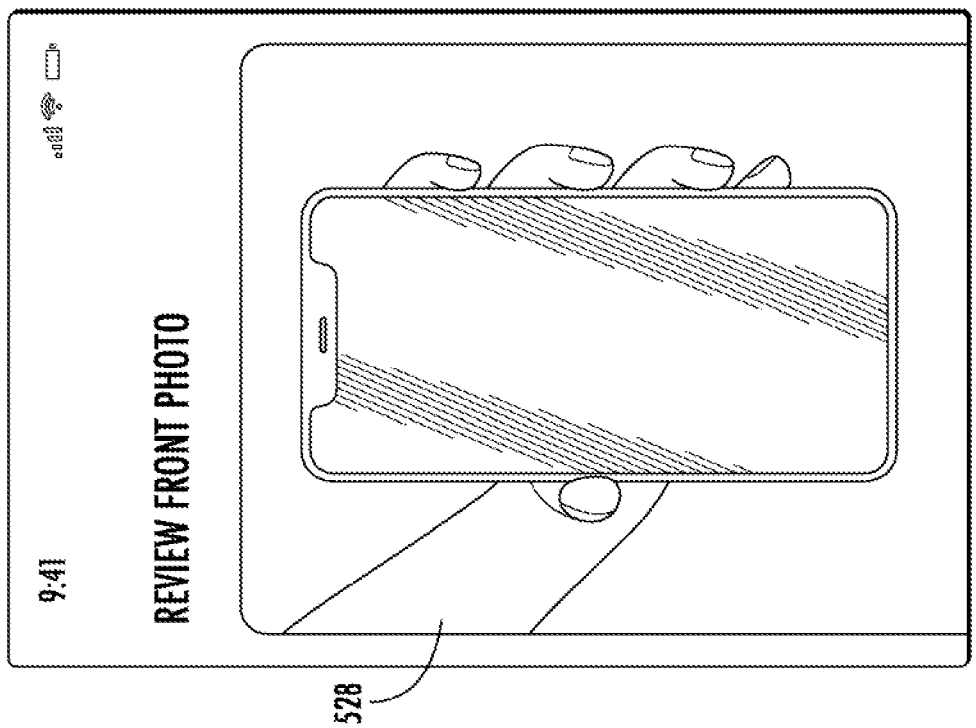
Figure 5L:
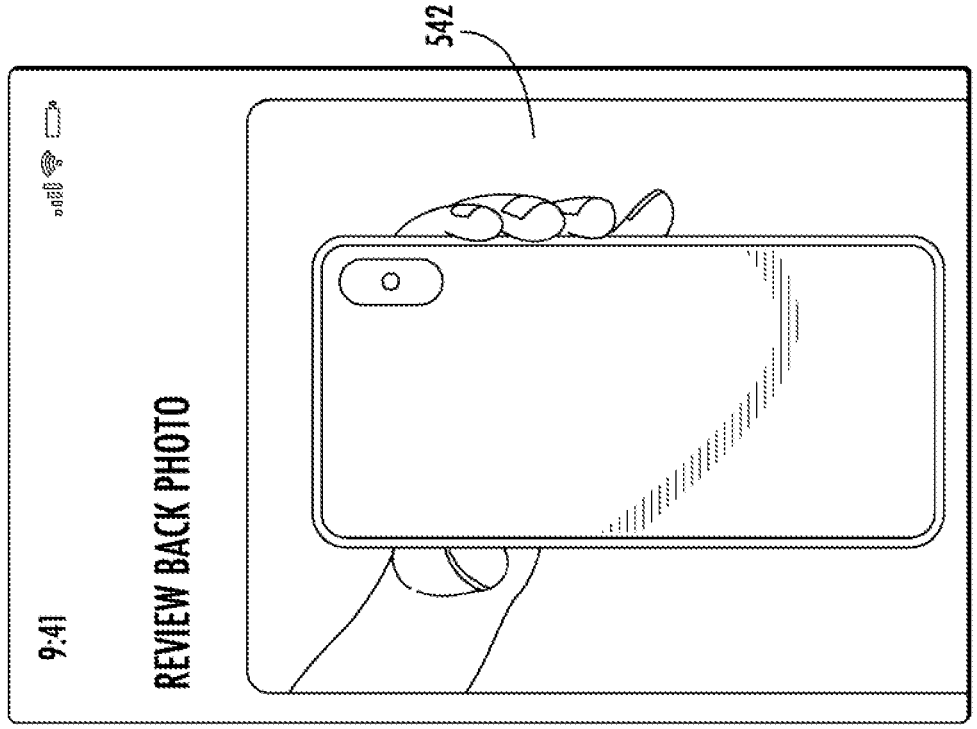
Figure 5K:
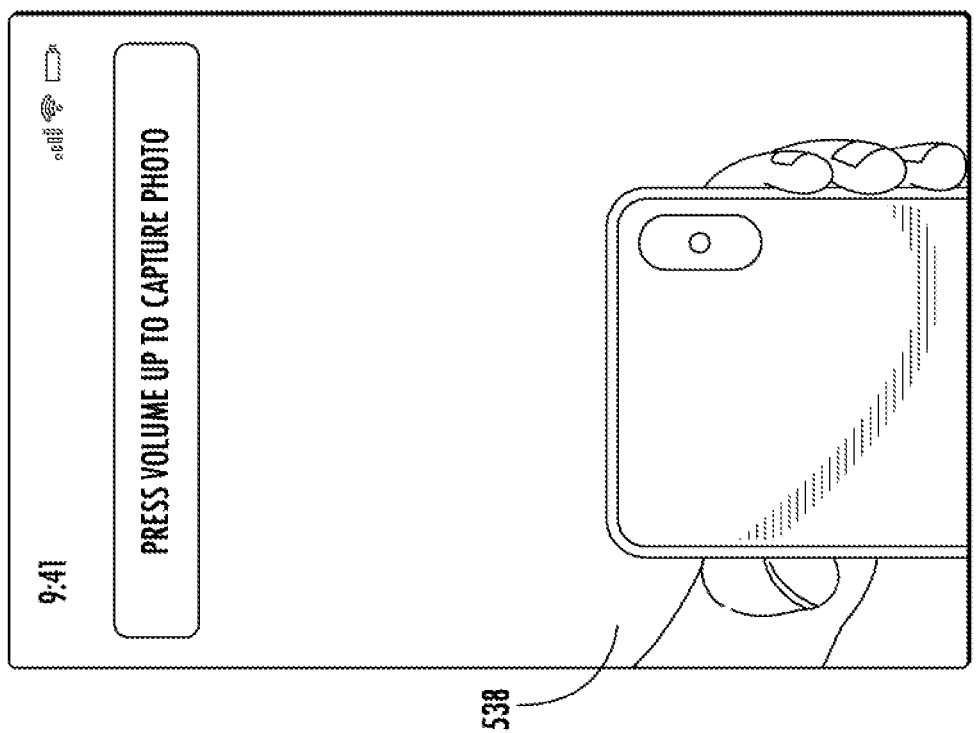
Figure 5N:
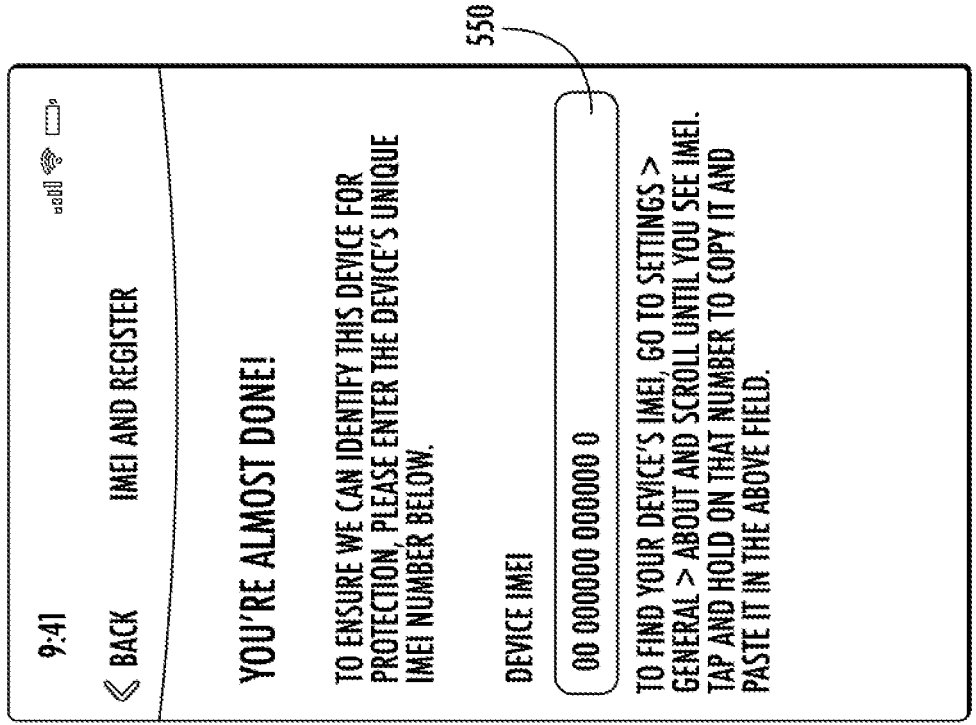
Figure 5M:
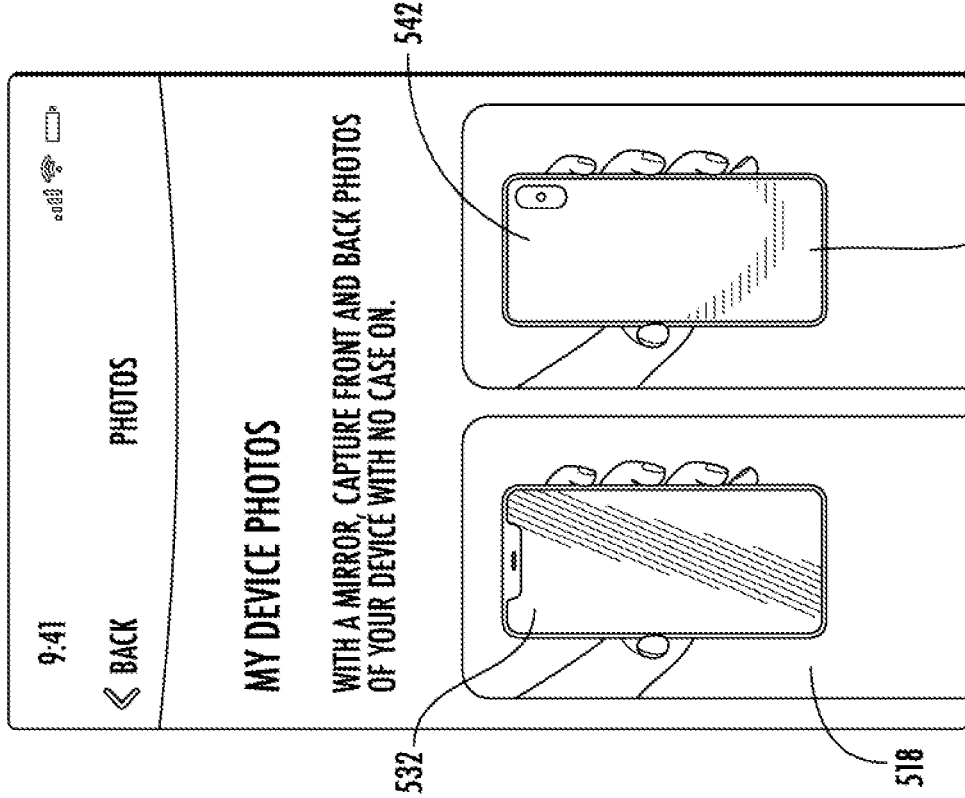
Figure 5P:
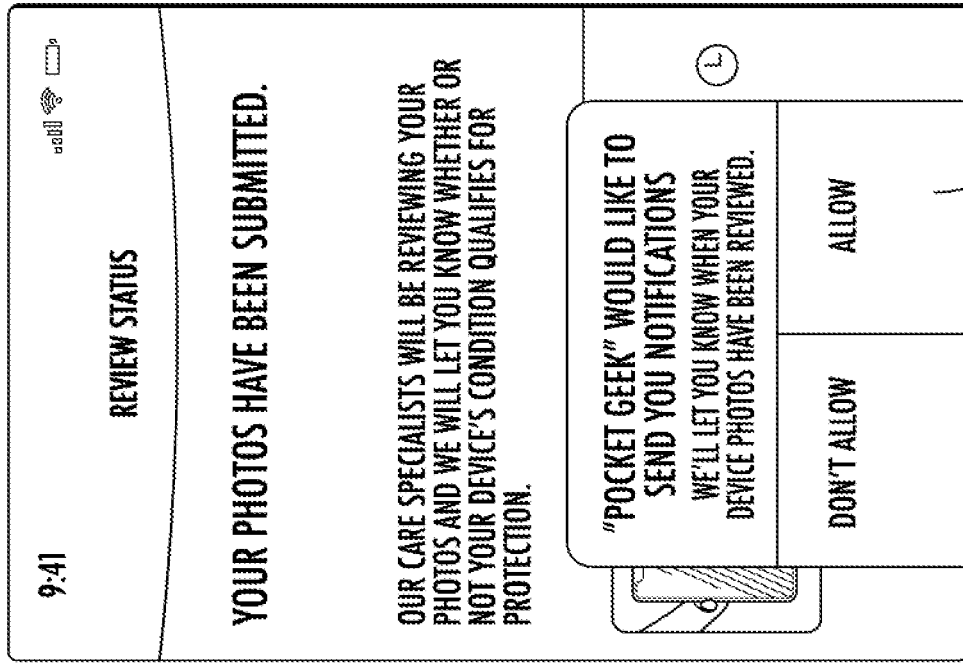
Figure 5O:
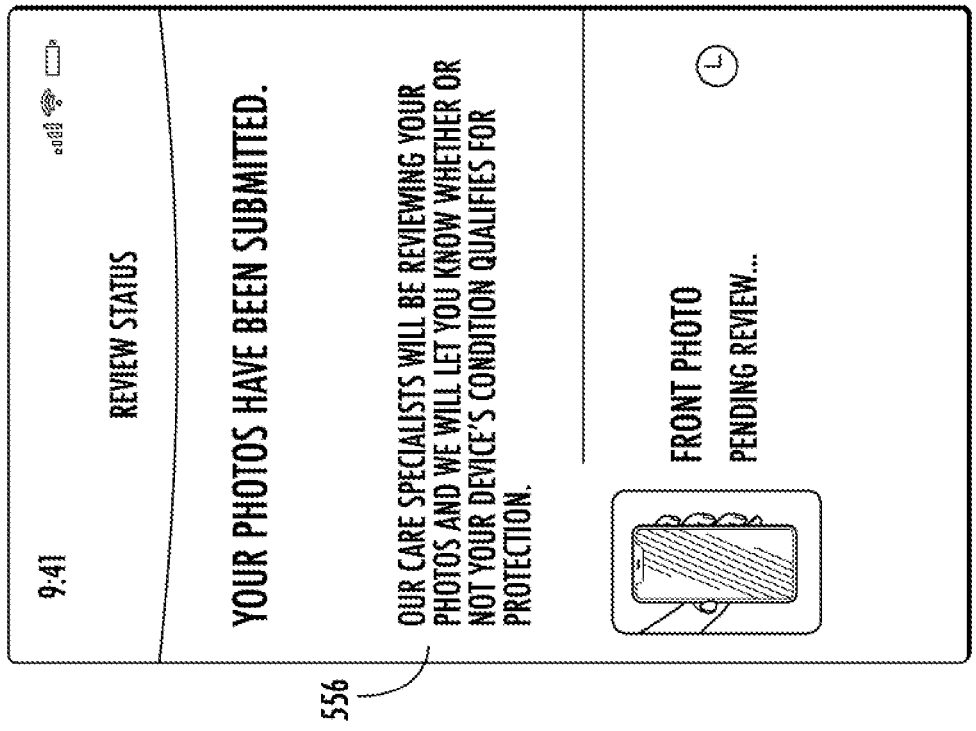
Figure 5R:
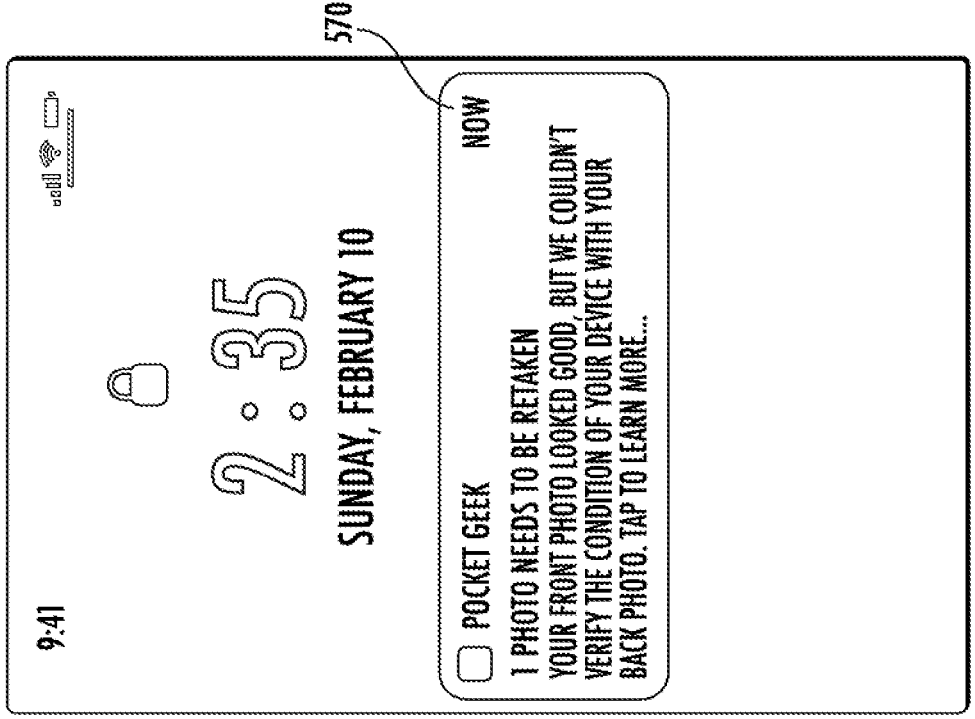
Figure 5Q:
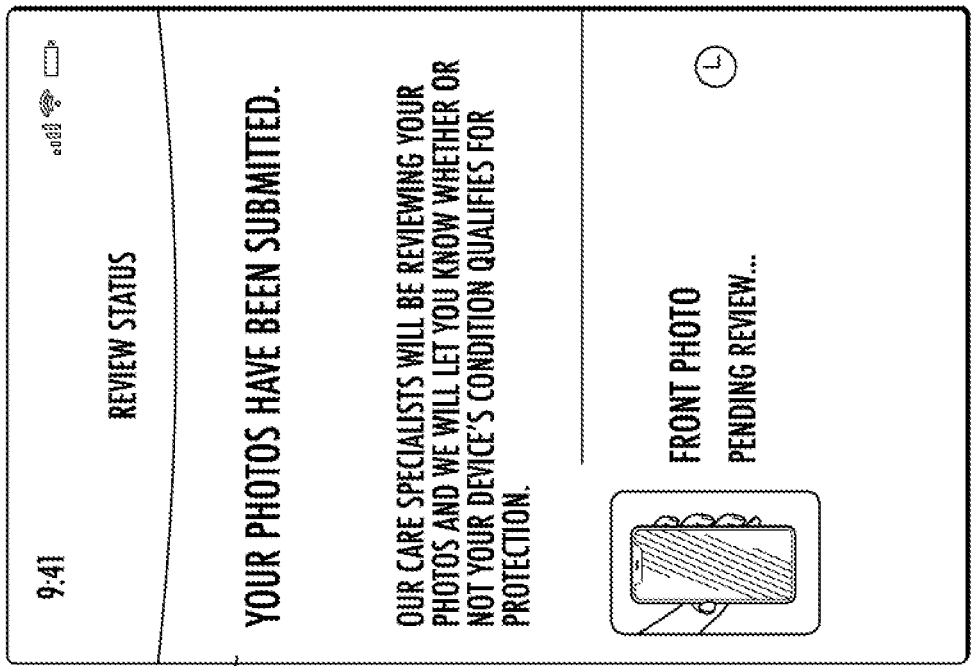
Figure 5T:
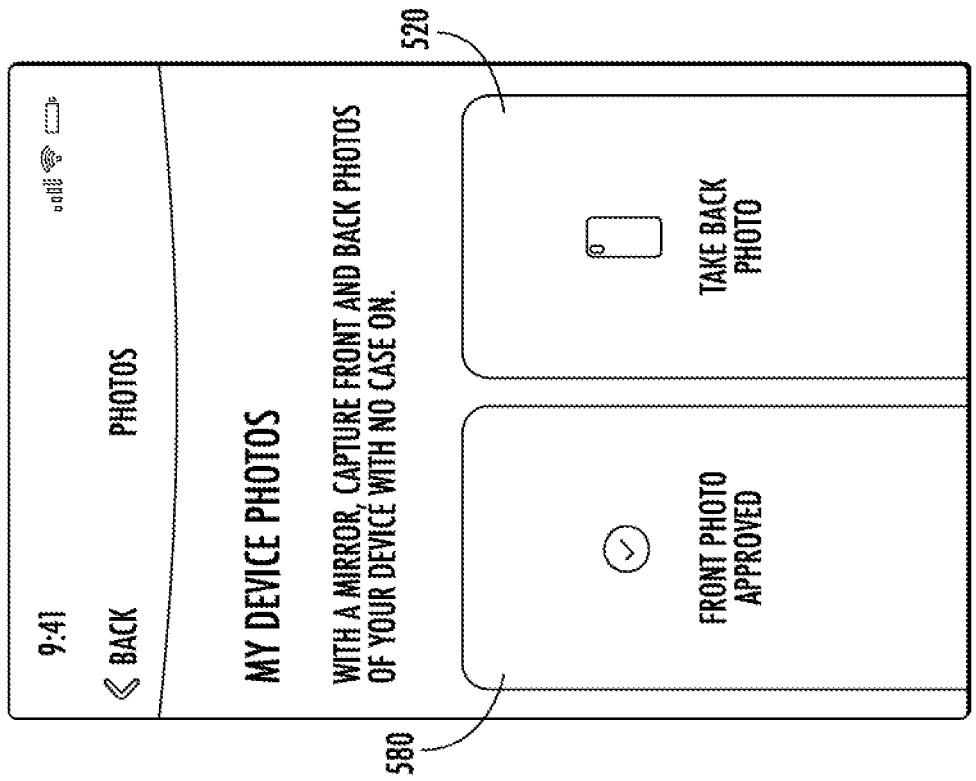
Figure 5S:
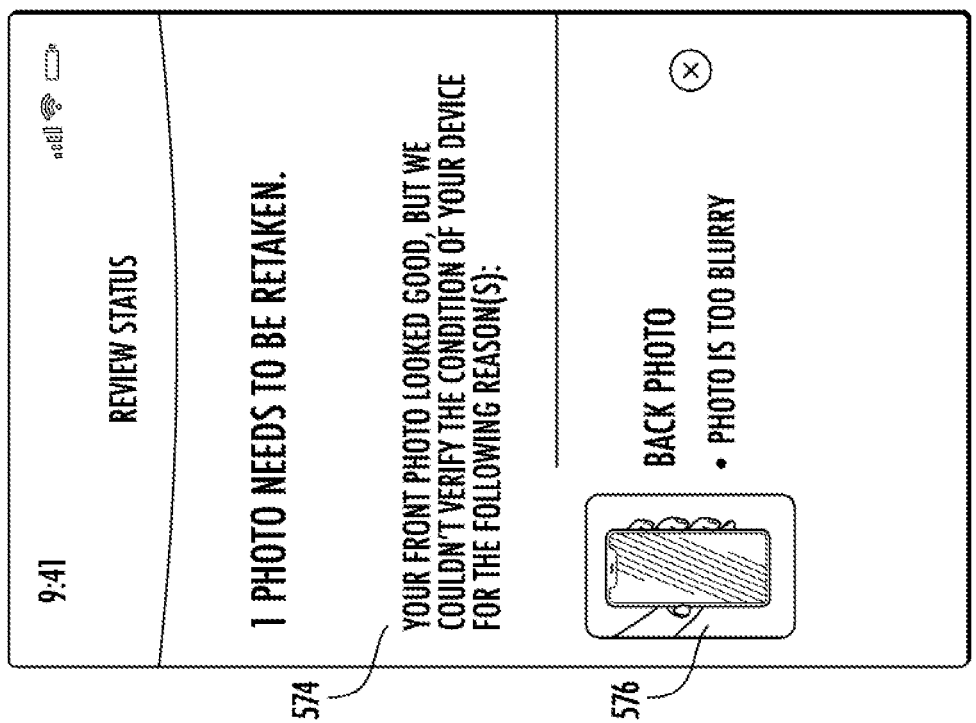
Figure 5V:
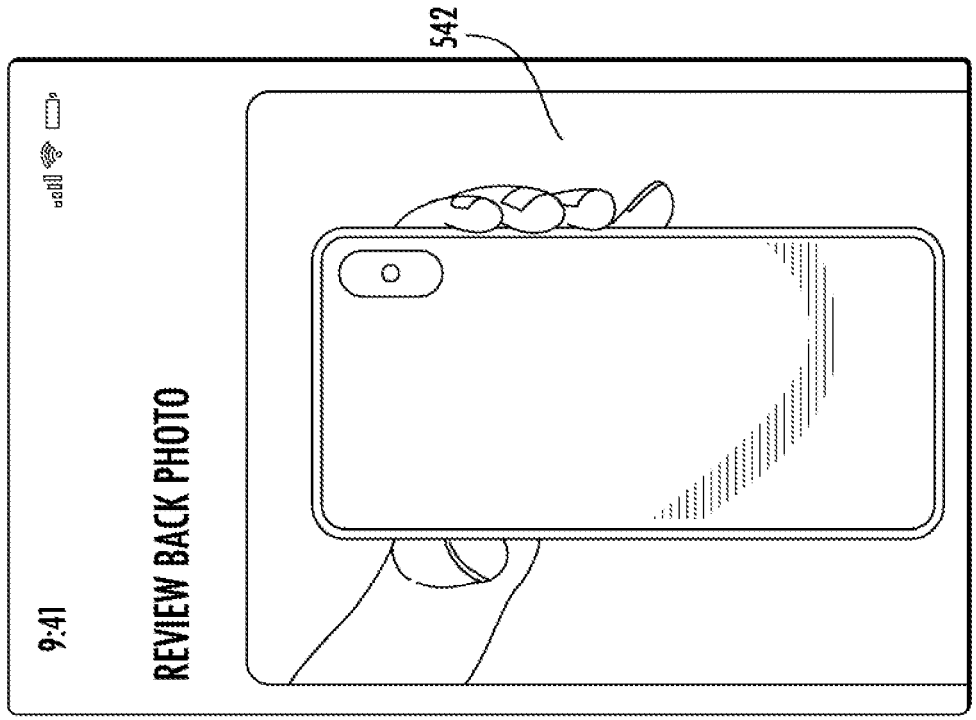
Figure 5U:
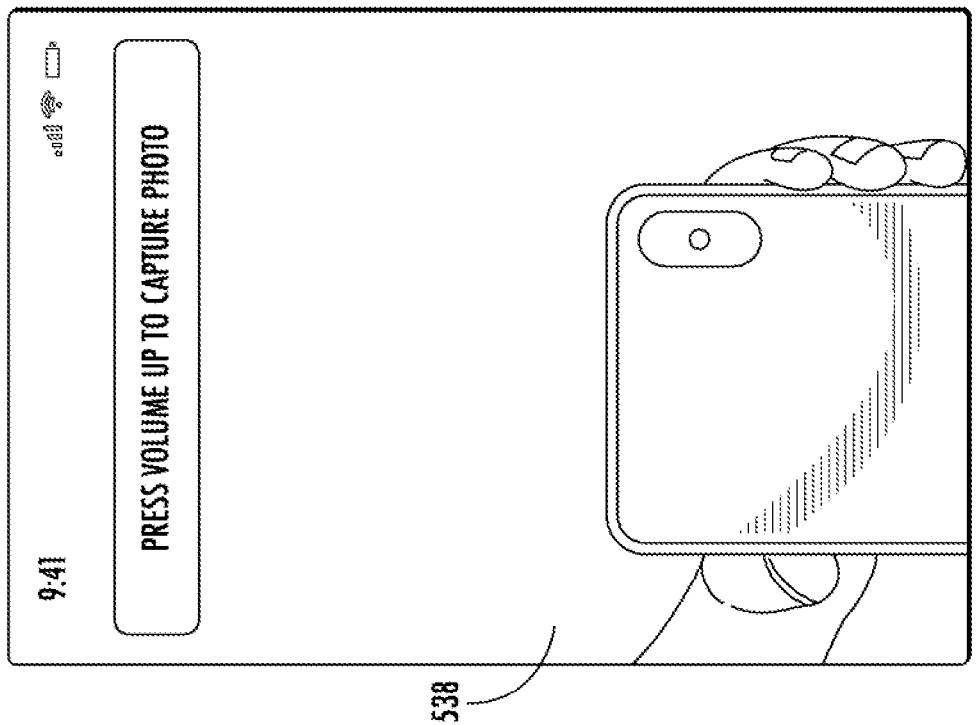
Figure 5X:
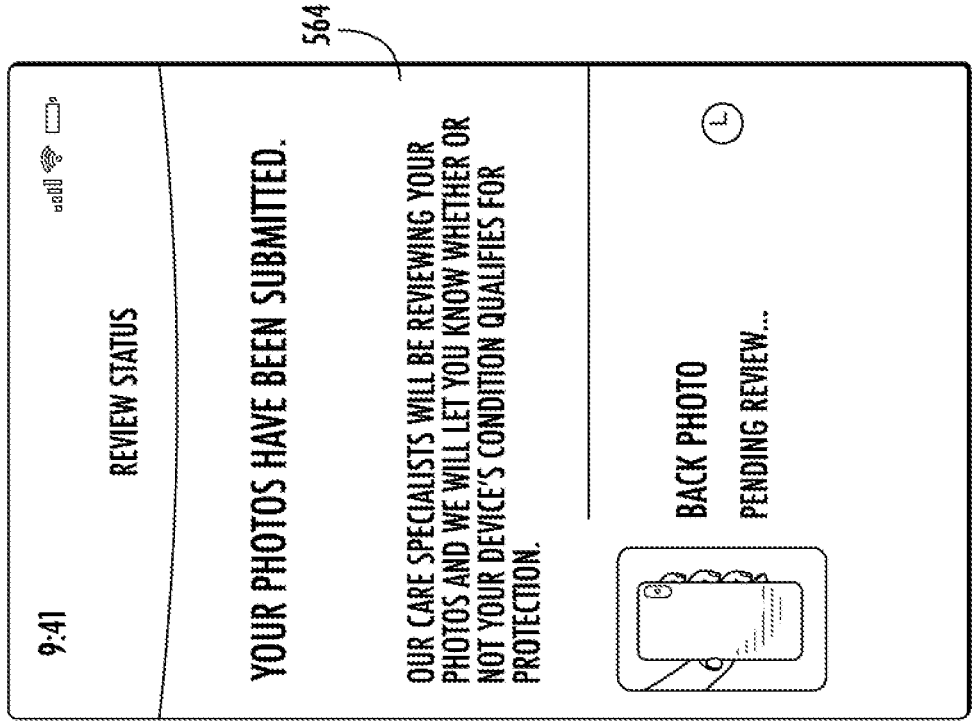
Figure 5W:
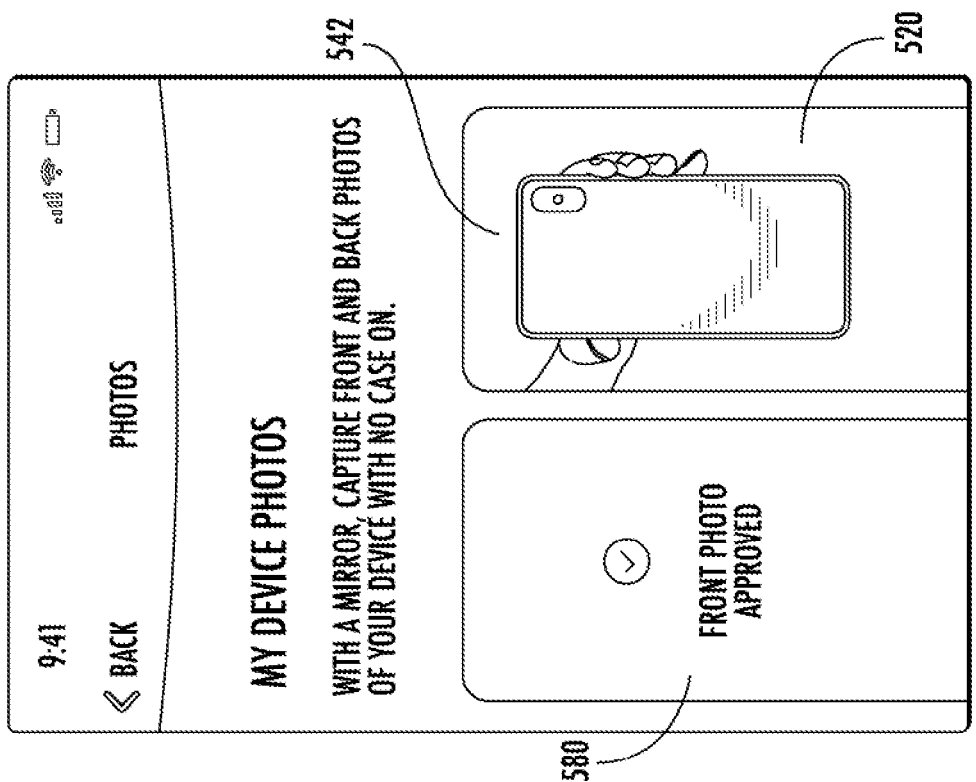
Figure 5Y:
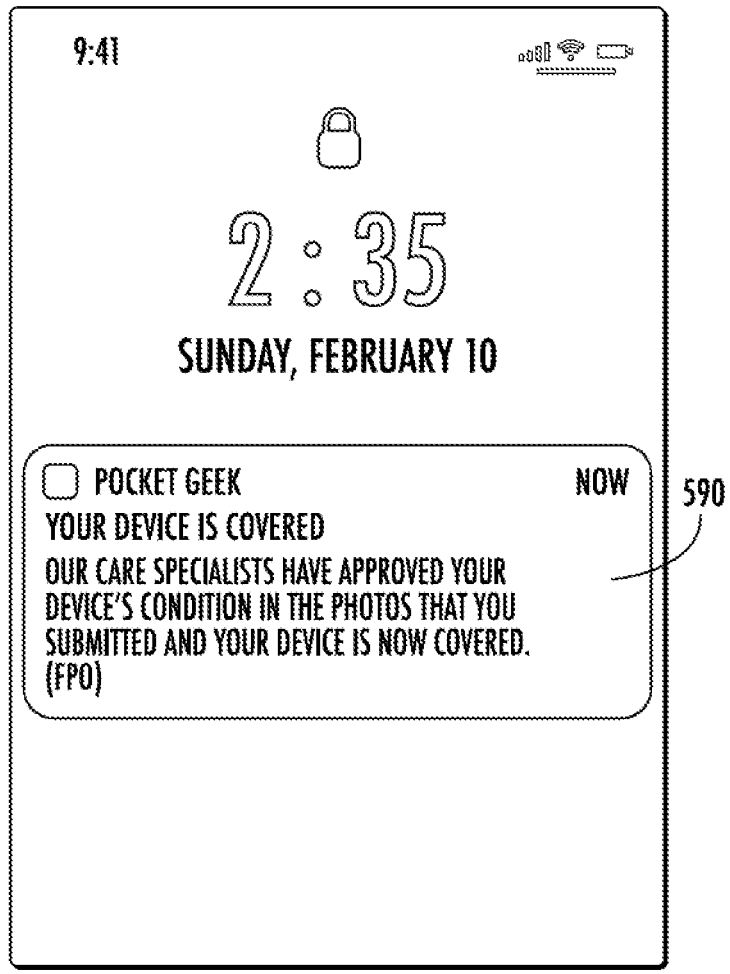
Figure 6:
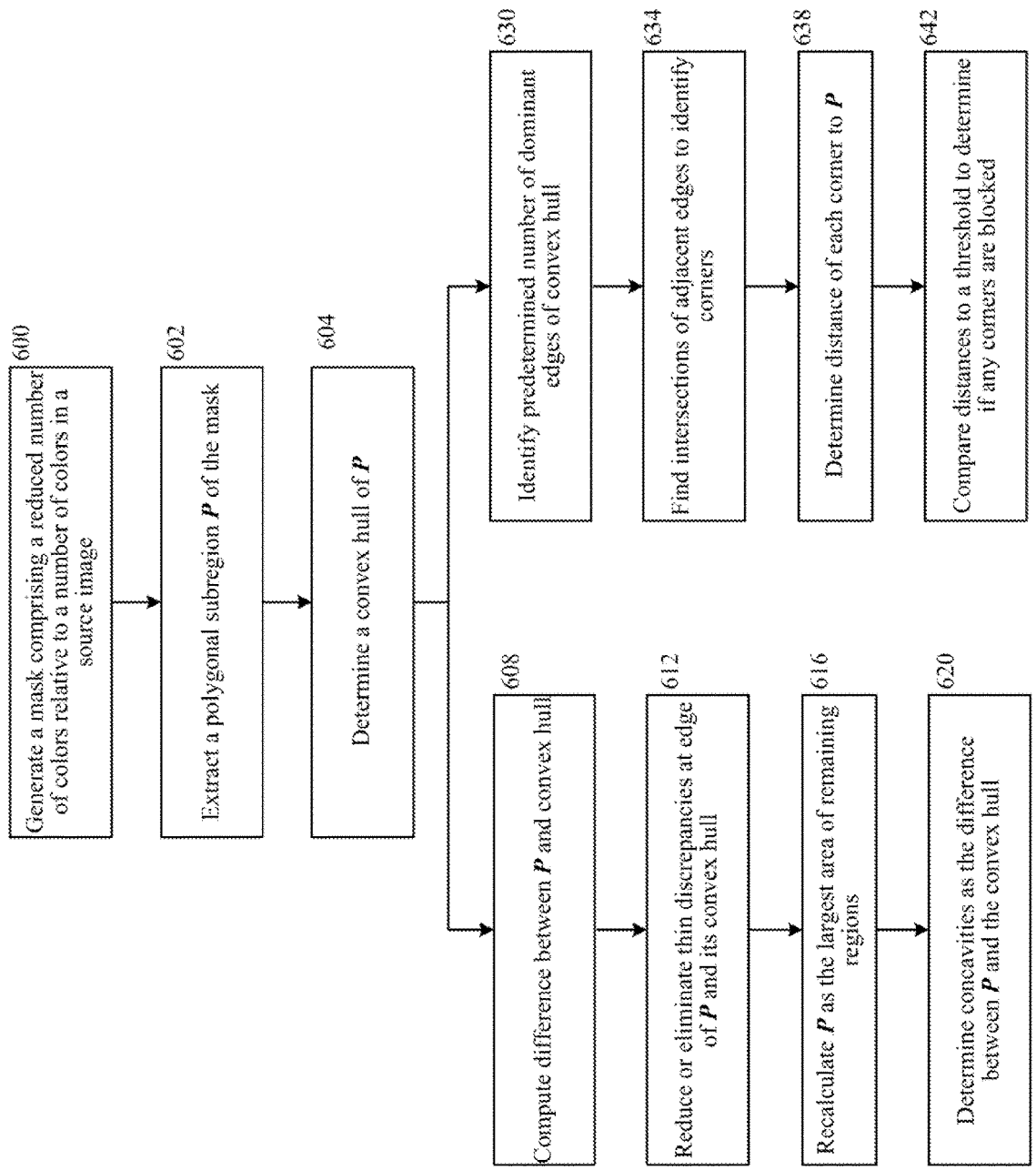
Figure 7A:
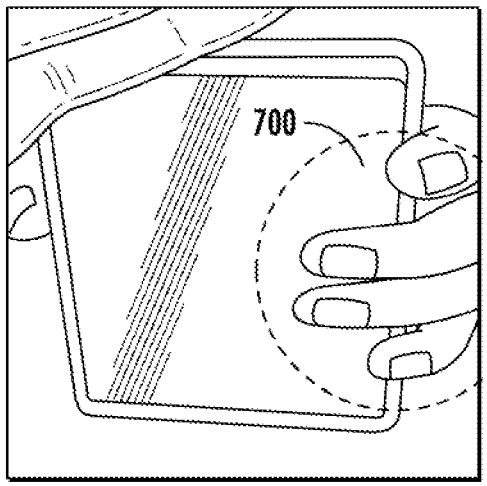
Figure 7B:
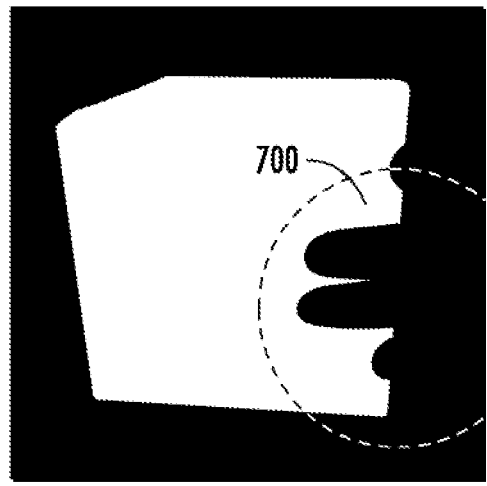
Figure 8A:
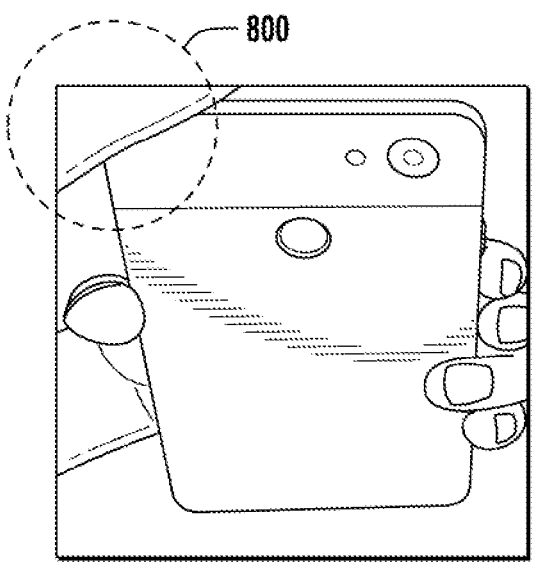
Figure 8B:
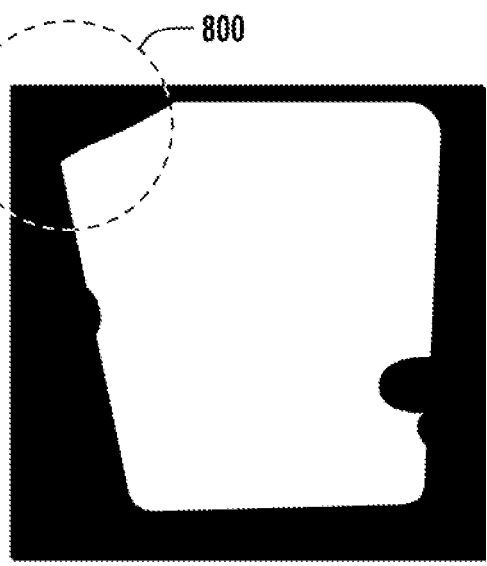

Having thus described embodiments of the invention in general terms, reference will now be made to the accompanying drawings, which are not necessarily drawn to scale, and wherein:

FIG. 1 illustrates a system for determining a mobile device integrity status according to some example embodiments;

FIG. 2 illustrates a block diagram of an apparatus in accordance with some example embodiments;

FIGS. 3 and 4A-4B are flowcharts illustrating operations for determining a mobile device integrity status in accordance with some example embodiments;

FIG. 4C illustrates a flow of data between models and/or the circuitry thereof in accordance with some example embodiments;

FIGS. 5A-5Y illustrate example user interfaces provided in accordance with some example embodiments;

FIG. 6 is a flowchart illustrating operation for detecting occlusions in images in accordance with some example embodiments;

FIGS. 7A and 8A illustrate examples images captured of a mobile device images in accordance with some example embodiments; and FIGS. 7B and 8B illustrate mobile device masks that may be generated respectively from the images of 7A and 8A images in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, and/or the like.

System Overview

FIG. 1 illustrates a system 100 for determining a mobile device integrity status, based on the processing of images of the device, according to example embodiments. The system of FIG. 1 may be further utilized to detect occlusions in an image, such as an image of a mobile device, according to example embodiments. It will be appreciated that the system of FIG. 1 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example configuration, numerous other configurations may also be used to implement embodiments of the present invention.

System 100 may include any number of mobile devices 104, or simply "device" as may be referenced herein. A mobile device 104 may be embodied as any mobile computing device, such as by way of non-limiting example, a cellular phone, smart phone, mobile communication device, tablet computing device, any combination thereof, or the like. Although described as a mobile device, in some embodiments, the mobile device 104 may instead be substituted for any fixed computing device, or other device, without departing from the scope of the present disclosure. The mobile device 104 may be used by a user to download, install and access a self-service app, such as one provided by a provider, to obtain coverage for the mobile device 104. Additionally or alternatively, the mobile device 104 may utilize a browser installed thereon to access a self-service web application, such as one hosted and/or provided by the provider. Still further, the mobile device 104 may be used to capture images for processing according to example embodiments.

The device integrity verification apparatus 108 may be associated with a provider, or any other entity, and may be any processor-driven device that facilitates the processing of requests for device integrity verification, such as those generated from a request to enroll a device in a device protection program. For example, the device integrity verification apparatus 108 may comprise one or more computers, servers, a server cluster, one or more network nodes, or a cloud computing infrastructure configured to facilitate device integrity verification, enrollment in a device protection plan, and/or other services relating to the provider. In certain embodiments, part or all of the device integrity verification apparatus 108 may be implemented on mobile device 104.

In certain example embodiments, the device integrity verification apparatus 108 hosts or provides a service enabling access by the mobile device 104 to request coverage, and further prompts the user of the mobile device 104, as described in further detail herein, to capture images via a camera of the mobile device 104 using a mirror. The device integrity verification apparatus 108 may process the images using one or more of the computer vision and image processing embodiments described herein to determine whether the device qualifies for coverage, as described in further detail herein. The device integrity verification apparatus 108 may comprise or access one or more models trained to analyze images and extract pertinent information as described in further detain herein and to determine the device integrity status. According to some embodiments, the collecting of training images, and the training of the model may be performed with the device integrity verification apparatus 108. The device integrity verification apparatus 108 may be further configured to maintain information regarding applied-for and issued device protection plans, and/or to facilitate communication amongst the mobile device 104 and/or an optional internal user apparatus 110.

The occlusion detection apparatus 109 may be any processor-driven device that facilitates the processing of images to determine whether an object in the image is occluded. For example, the occlusion detection apparatus 109 may comprise one or more computers, servers, a server cluster, one or more network nodes, or a cloud computing infrastructure configured to facilitate the processing of images and identification of occlusions. According to certain embodiments, the device integrity verification apparatus 108 may integrate with the occlusion detection apparatus 109 to determine whether a mobile device in an image is occluded by fingers, and/or the like.

The optional internal user apparatus 110 may comprise any computing device or plurality of computing devices that may be used by a provider and/or other entity to facilitate device integrity verification. As an example, the internal user apparatus 110 may be implemented at a support center or central facility remote from the mobile device that may be staffed with one or more customer service representatives that may utilize an application provided by the device integrity verification apparatus 108 to receive the result of the device integrity verification server, which may permit further processing or analysis or may facilitate additional review of the images prior to verification. For example, in instances in which the device integrity verification apparatus 108 indicates further internal review of certain images is needed for verification, such as by an inconclusive mobile device integrity status, the internal user apparatus 110 may be used by support staff to review the images and confirm or reject the integrity of the mobile device 104, thereby respectively confirming or denying coverage of the mobile device 104 in a device protection plan. The internal user apparatus 110 may be further utilized by internal users to capture training images and/or label training images with which to train a model(s). It will be appreciated that the internal user apparatus 110 may be considered optional. In some embodiments, the device integrity verification apparatus 108 may facilitate faster processing by automatically verifying or rejecting the integrity of the mobile device.

According some embodiments, the various component of system 100 may be configured to communicate over a network, such as via the network 106. For example, a mobile device 104 may be configured to access the network 106 via a cellular connection, wireless local area network connection, Ethernet connection, and/or the like. As such, the network 106 may comprise a wireline network, wireless network (e.g., a cellular network, wireless local area network, wireless wide area network, some combination thereof, or the like), or a combination thereof, and in some example embodiments comprises at least a portion of the Internet.

As described above, certain components of system 100 may be optional. For example, the device integrity verification apparatus 108 may be optional, and the device integrity verification may be performed on the mobile device 104, such as by a self-service app installed on the mobile device 104.

Referring now to FIG. 2, apparatus 200 is a computing device(s) configured for implementing mobile device 104, device integrity verification apparatus 108, image detection occlusion server 109, and/or internal user apparatus 110, according to example embodiments. Apparatus 200 may at least partially or wholly embody any of the mobile device 104, device integrity verification apparatus 108, image detection occlusion server 109, and/or internal user apparatus 110. Apparatus 200 may be implemented as a distributed system that includes any of the mobile device 104, device integrity verification apparatus 108, image detection occlusion server 109, and/or internal user apparatus 110, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional in the device integrity verification apparatus 108. Additionally, some embodiments may include further or different components, devices, or elements beyond those illustrated in and described with respect to FIG. 2.

Apparatus 200 may include processing circuitry 210, which may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the mobile device 104, device integrity verification apparatus 108, image detection occlusion server 109, and/or internal user apparatus 110, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as mobile device 104, device integrity verification apparatus 108, image detection occlusion server 109, internal user apparatus 110, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. As another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as mobile device 104, device integrity verification apparatus 108, image detection occlusion server 109, and/or internal user apparatus 110, memory 214 may be configured to store computer program code for performing corresponding functions thereof, as described herein according to example embodiments.

Still further, memory 214 may be configured to store the model(s), and/or training images used to train the model(s) to predict certain pertinent information in subsequently received images. The memory 214 may be further configured to buffer input data for processing by the processor 212. Additionally or alternatively, the memory 214 may be configured to store instructions for execution by the processor 212. In some embodiments, the memory 214 may include one or more databases that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. For example, in embodiments in which apparatus 200 is implemented as the mobile device 104, the user interface 216 may, in some example embodiments, provide means to display instructions for capturing images. In embodiments in which apparatus is implemented as the internal user apparatus 110, the user interface 216 may provide means for an internal user or associate to review images and verify or reject the integrity of the mobile device 104. The user interface 216 may be further used to label training images for the purpose of training the model(s). In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of the mobile device 104, device integrity verification apparatus 108, internal user apparatus 110, and/or apparatus 200 over a network, such as network 106. Accordingly, the communication interface 218 may, for example, include supporting hardware and/or software for enabling wireless and/or wireline communications via cable, digital subscriber line (DSL), universal serial bus (USB), Ethernet, or other methods.

Apparatus 200 may include one or more image capture sensors 220, such as when apparatus 200 is embodied by the mobile device 104. An image capture sensor 220 may be any sensor, such as a camera or other image capture device, configured to capture images and/or record video from the mobile device 104, and may include a front facing image capture sensor (e.g., camera) configured on the same side of the device as a display screen, and/or a rear facing image capture sensor (e.g., camera) on the rear surface of the device (e.g., on a side of the device lacking a display screen). In some embodiments, the mobile device 104 may include both a front facing and rear facing image capture sensors, and in some embodiments, the mobile device 104 may include only one of a front facing image capture sensor or rear facing image capture sensor. In some embodiments, any number of image capture sensors 220 may be present on apparatus 200 (e.g., the mobile device 104). DETERMINING A MOBILE DEVICE INTEGRITY STATUS Having now generally described example embodiments of the system 100, and apparatuses for implementing example embodiments, FIGS. 3 and 4A-4B are flowcharts illustrating example operations of an apparatus 200, according to some example embodiments. The operations may be performed by apparatus 200, such as mobile device 104, device integrity verification apparatus 108, occlusion detection apparatus 109, and/or internal user apparatus 110.

FIG. 3 illustrates example operations for determining a mobile device integrity status, such as for the enrollment of the mobile device 104 in a device protection plan, according to example embodiment. As shown in operation 302, apparatus 200 may include means, such as mobile device 104, device integrity verification apparatus 108, processor 212, memory 214, user interface 216, communication interface 218, and/or the like, for receiving a device integrity verification request associated with a mobile device. In this regard, a user may access an application (or "app,") installed on the mobile device 104, or a website hosted by the device integrity verification apparatus 108 to request enrollment in a device protection plan. In some embodiments, the device integrity enrollment request may be generated by the device integrity verification apparatus 108 or the internal user apparatus 110 during onboarding of the device and/or user. In this regard, according to certain embodiments, the device integrity verification request may comprise or accompany details regarding a requested policy and/or coverage (e.g., order), and/or other account information relating to the user, user's contact information and/or the like. It will be appreciated that the device integrity verification request may be generated for purposes other than device onboarding in a protection plan.

Example embodiments may prompt users to provide, such as via the user interface 216, certain personal information, mobile device service provider information, and/or user-provided device information regarding their device. According to some embodiments, the user may be instructed to use the mobile device 104 to continue the enrollment process using the device they wish to enroll. For example, FIGS. 5A, 5B, 5C, and 5D are examples of user interfaces that may provide introductory information to a user and may be used to collect at least some data from the user, such as their mobile device service provider and/or mobile device information (e.g., make, model and/or the like). For example, as illustrated in FIG. 5A, introductory message 500 is provided. As illustrated in FIG. 5B, a prompt 502 to select a mobile device service provider is provided, as well as selectable options 504 or eligible mobile device service providers. Once the mobile device service provider is selected by a user, as illustrated in FIG. 5C, a confirmation 510 of the selected mobile device service provider is provided, as well as content and links to additional information 512.

As shown in operation 304, apparatus 200 may include means, such as mobile device 104, device integrity verification apparatus 108, processor 212, memory 214, user interface 216, communication interface 218, and/or the like, for receiving a mobile device identifying data object comprising information describing the mobile device, such as mobile device 104. As described above, the user may be prompted to provide, via user interface 216, information describing the device the user desires to enroll for protection. In some embodiments, the user may provide such information via a separate interface and/or network, such as by a personal computer or other mobile or fixed computing device. Any such data describing the device and/or hardware thereof, such as device type (e.g., make, model identifier), International Mobile Equipment Identity (IMEI), and/or the like may be stored in the mobile device identifying data object.

According to some embodiments, the mobile device identifying information may not need to be provided by a user, and the mobile device data object may store the IMEI and/or other mobile device identifying information obtained systematically by the website and/or an app when the user accesses the website and/or app using the mobile device 104. The mobile device identifying data object may therefore include other information used to identify or uniquely identify a device, such as a type of device, device model identifier, serial number, and/or the like. Although FIG. 5N (described in further detail below) illustrates a user interface enabling user-entry of the device IMEI, it will be appreciated that according to some example embodiments, the IMEI may be obtained systematically as set forth above. Obtaining the mobile device identifying information systematically may therefore limit or reduce fraud, such as by preventing a user from entering an IMEI of a stolen, lost, or damaged device.

The mobile device identifying data object may be used to enroll the device in a device detection plan, such that upon subsequently making a claim, a consumer can produce the device reflecting data that matches data stored in the mobile device identifying data object (e.g., IMEI). For claims relating to a lost or stolen device, a mobile device service provider may prevent future network access and/or use of the device by using data stored in the mobile device identifying data object (e.g., IMEI).

In operation 306, apparatus 200 may include means, such as mobile device 104, device integrity verification apparatus 108, processor 212, memory 214, user interface 216, communication interface 218, and/or the like, for causing display on the mobile device 104 of a prompt to capture at least one image of the mobile device using one or more sensors of the mobile device and a reflective surface, such as a mirror. FIGS. 5D, 5E, 5F, 5G, 5H, 5I, 5J, 5K, 5L, 5M, 5U, 5V, 5W are example user interfaces for guiding the user through capture of images of their mobile device, using a front facing camera, rear facing camera, or both. As illustrated in FIG. 5D, instructional information 514 may be provided to the user to provide an overview of certain steps relating to photographing the mobile device. As illustrated in FIG. 5E, image capture instructions 516 are provided, as well as selectable prompts 518 and 518, indicating to capture images of the front and rear (back) of the device, respectively. In response to selection of a selectable prompt 518 and/or 518, processor 212 of example embodiments invoke an image capture sensor 220 associated with the respective selected prompt 518 or 520. For example, in an instance in which the prompt 518 is selected to capture an image of the front of the mobile device 104, processor 212 of the mobile device 104 may invoke a front-facing image capture sensor 220. In an instance in which the prompt 520 is selected to photograph the rear of the mobile device 104, processor 212 of the mobile device 104 may invoke a rear-facing image capture sensor 220. According to some embodiments, any image capture sensor 220 with image capturing capabilities may be utilized to capture the images. As illustrated in FIG. 5F, example embodiments may provide an image capture instruction 526, which may be specific to a device type of the mobile device 104. For example, the image capture instruction 526 of FIG. 5F indicates instructions to utilize a 'volume-up' hard-key of the mobile device 104 to capture an image. It will be appreciated that various implementations may be contemplated, such as utilizing a hard-key or soft-key (not shown in FIG. 5F) to capture an image. In certain embodiments, the implementation may vary dependent on the device type of the mobile device 104.

As shown in FIG. 5G, certain mobile devices 104 may provide a security alert 528 to prompt the user to allow a mobile application provided by the example embodiments provided herein to access or invoke an image capture sensor 220 such as a camera. If a user has previously allowed or confirmed the request to allow the mobile application access, the message may not be displayed. In any event, if access is granted by the user to allow the mobile application to access the image camera provided 220, as shown in FIG. 5H, the display may reflect a view finder 532 to show the image that may be captured.

In addition to providing a prompt to capture the image, example embodiments may cause the user interface 216 to transition to display a test pattern, that may provide for improved accuracy in downstream processing of captured images including the device display. For example, the displayed test pattern may comprise an all-white display screen, as depicted in FIG. 5H, or other test pattern, identified as enabling efficient identification of damages such as cracks and water damage, and/or as enabling efficient identification of a display portion of the mobile device relative to a bezel, for example.

Accordingly, the system may direct and cause the user to hold the mobile device 104 in front of a mirror or other reflective surface and use the mobile device 104 to capture the images, for example, with one or more sensors (e.g., image capture sensor 220) of the device. Once the image is captured as directed by the user, the captured image may be displayed as a confirmed captured image 528, in FIG. 5I. Accordingly, as shown in FIG. 5J, the captured image 532 may be displayed in the area of the selectable prompt 518 as is illustrated in FIG. 5E, which may be selectable to enable the user to recapture the image. In FIG. 5J, the selectable prompt 520 is displayed similarly as in the display of FIG. 5E, to indicate the rear photo has not yet been captured.

Upon selection of selectable prompt 520, processor 212 may invoke a rear-facing image capture sensor 220 of the mobile device 104 and display a view finder 538 of an image to be captured, as illustrated in FIG. 5K. The user may follow the prompt or provide an input to capture the image, and the captured image 542 may be displayed as provided in FIG. 5L. Accordingly, the display as shown in FIG. 5M may be updated to reflect captured images 532 and 542 in the area of the respective selectable prompts 518 and 518. The selectable prompts 518 and 518 may be selected to change, edit, or confirm the captured images.

Returning to the description of FIG. 3, in operation 308, and in response to the above described image capture operations, apparatus 200 may include means, such as mobile device 104, device integrity verification apparatus 108, processor 212, memory 214, image capture sensor 220, communication interface 218, and/or the like, for receiving the at least one image captured by the mobile device. The images may therefore be captured by the mobile device 104 and transmitted to the device integrity verification apparatus 108 (e.g., via the app installed on the mobile device and/or website of the device integrity verification apparatus 108). Additionally or alternatively, the images may be received locally by the mobile device 104 and further processed on the mobile device 104 as described below.

Identifiers generated by the app or website may be associated with images indicating whether a particular image was submitted as an image of the front of the device, or the rear of the device. The identifiers may be received at the mobile device 104 and/or by the device integrity verification apparatus 108 in association with the received images.

According to example embodiments, as shown by operation 310, apparatus 200 may include means, such as mobile device 104, device integrity verification apparatus 108, processor 212, memory 214, and/or the like, for pre-processing the image. According to example embodiments, a received image may be cropped, as described in further detail herein. According to example embodiments, a received image may be converted or reduced to a predetermined size, for example, such as 300 pixels by 300 pixels. According to certain example embodiments, some operations described herein may be performed using a single shot detection algorithm, meaning the full image (which may be cropped and resized) is processed as described herein. However, in some embodiments, an image may be divided into sections for individual processing according to any of the operations described herein, and reassembled such that example embodiments utilize the respective data and/or predictions relating to the separate sections.

As shown by operation 314, apparatus 200 may include means, such as mobile device 104, device integrity verification apparatus 108, processor 212, memory 214, and/or the like, and with a trained model(s), for processing the at least one image to determine a mobile device integrity status. Example operations for determining a mobile device integrity status, according to example embodiments, are described below with respect to FIGS. 4A-4B, a flowchart spanning 2 pages.

Determining a mobile device integrity status may comprise processing the images through a series of conditions implemented by respective algorithms and/or models. The predictions or outcomes regarding the conditions may indicate the mobile device integrity status. For example, a mobile device integrity status may include "verified," indicating the mobile device identity is confirmed and the mobile device is in an acceptable condition for enrollment in a protection plan. A mobile device integrity status of "not verified," may indicate the device has not yet been verified and/or that any one or more conditions needed for verification may not have been met.

According to some embodiments, an optional mobile device integrity status of "inconclusive" may indicate that example embodiments determined conditions needed for verification are likely met, but that further review should be performed prior to final verification. Accordingly, in certain embodiments, determinations of mobile device integrity status may be based on the predictions made by the various models and/or algorithms, and on confidence levels returned by any of the models and/or algorithms indicating the confidence level of a certain prediction. In some embodiments, as described herein, verification conditions may include detecting the presence and location of the mobile device, detecting occlusions in the mobile device image, and other relevant assessments. Some embodiments may further evaluate whether a device is insurable and/or uninsurable.

For simplification, the operations of FIGS. 4A-4B are described with respect to the processing of a single image, but it will be appreciated that the processing of a front facing image and rear facing image may occur simultaneously or in tandem, such that both the front face and rear face of the device are considered in verifying the integrity of the device. According to some embodiments, only one image may need to be processed to verify the integrity of the device. In any event, an "image status" may therefore relate to predictions relating to one image (e.g., front facing image, or rear facing image). An image status of "verified" may be required for one or more images (e.g., front and/or rear), in order for example embodiments to determine the mobile device integrity status as "verified." Such determinations are described in further detail below with regard to operations 440, 442, 446, 448, and 450.

According to some embodiments, determinations of whether a specific condition is met or not met may be implemented with model(s) trained to make predictions regarding the images and/or other algorithms configured to determine qualities of the images. FIG. 4C provides an example hierarchy of model(s), that may be used to implement the operations of FIGS. 4A-4B, according to example embodiments. FIG. 4C shows the flow of data from one trained model to another, according to example embodiments. Example models, configured on memory 214 and used and/or trained by example embodiments, such as with processor 212, may include, among others:

A mobile device presence model 486 trained to detect whether a mobile device is present in an image;

A location detection and cropping model 488 trained to detect the location of a mobile device and optionally crop the image;

A cover detection model 490 trained to detect a cover on a mobile device present in the image;

A mobile device front/rear identification model 492 trained to determine whether an image reflects the front or rear of the device;

A mobile device authenticity model 494 trained to determine whether the image includes the mobile device from which the image was captured;

An occlusion detection model 496 trained to generate a mask used to determine whether an object in an image is occluded; and A damage detection model 498 trained to detect damage to the mobile device in the image.

FIG. 4C reflects tiers of the models, through which images are fed according to example embodiments. If a particular model predicts that the image does not satisfy a particular condition, example embodiments may prevent further processing by additional models. However, if a particular model predicts that the image satisfies its respective condition(s), the image may continue to be processed by additional models as illustrated in the tiered architecture of FIG. 4C. In this manner, the efficiency of the system may be improved, increased, and/or maximized relative to a system that performs processing of every condition regardless of other outcomes. It will be appreciated that the order of the models through which the images flow, or are processed, may be configured in a different or modified order from that illustrated in FIG. 4C. In some embodiments, any one or more models may be run separately for its(their) intended purpose without requiring each step shown in FIG. 4C. In this regard, any of the models described herein, and their respective predictions, may be leveraged and/or utilized for other purposes, in addition to or instead of determining an image status and/or mobile device integrity status.

Similarly, the order of operations and/or conditions described with respect to FIGS. 4A-4B, may be modified. For example, operations identified as less resource-consuming than others may be processed prior to those identified as consuming more resources. Additionally or alternatively, if a particular condition is not verified that is known to commonly result in low confidence or low accuracy rate of other predictions, the particular condition may be intentionally configured to be processed in advance of another condition. For example, if example embodiments do not verify an image include a mobile device (operation 400, described below), then it may not accurately determine whether the image is of a front side or rear side of a device (operation 406, described below).

Continuing with the description of FIG. 4A, as shown in operation 400, apparatus 200 may include means, such as mobile device 104, device integrity verification apparatus 108, processor 212, memory 214, mobile device presence model 486 and/or the like, for determining whether the at least one image includes a mobile device. The determination may be made with a mobile device presence model 486 deployed on the mobile device 104 and/or device integrity verification apparatus 108, for example. Although the user interface 216 prompts the user to capture images of the user's device using a mirror, users may submit images that do not include a mobile device. For example, some users may attempt to commit fraud by taking a photo of a piece of paper mocked up to appear as a mobile device. Others may intentionally or inadvertently capture images that do not include the mobile device.

The processor 212 may process a subject image with at least one trained model (e.g., neural network), trained with a plurality of training images that are each labeled as either including a mobile device or excluding a mobile device, to determine whether the subject image includes a mobile device.

In any event, if example embodiments, such as with the mobile device presence model 486, predict that the at least one image does not include a mobile device, as shown by operation 430, apparatus 200 may include means, such as mobile device 104, device integrity verification apparatus 108, processor 212, memory 214, user interface 216, communication interface 218, and/or the like, for providing feedback to the user indicating to capture an image of their device, and/or determining an image status as "not verified." The feedback may include causing one or more instructions to be transmitted to and/or displayed on the mobile device.

In this regard, the user may be given the opportunity to recapture the image for reprocessing and verification. A message such as that displayed in the user interface of FIG. 5R may be provided to the user. Operation 430 indicates optionally providing user feedback, but it will be appreciated that according to some embodiments, as an outcome of certain or all conditional operations 400, 403, 405, 406, 410, 416, 420, 426 and/or 442, more specific instructions relating to a particular condition processed but not leading to verification of device integrity (e.g., a problem with the captured imaged) may be provided to the user. If the user provides a new image(s), processing may return to operation 400 to processing the newly captured image.

It will be appreciated that in certain example embodiments, operation 400 may be performed in a single shot per image, or the image may be subdivided into sections such that each separate section is processed as described herein.

If example embodiments determine the at least one image includes a mobile device, further processing may continue at operation 403. At least some of the remaining operations of FIGS. 4A-4B, are described with reference to the mobile device in the image, or the captured mobile device. It will be appreciated that such references refer to the processor-driven prediction that a mobile device is likely present in the image, such that the captured mobile device is a suspected mobile device.

In operation 403, apparatus 200 may include means, such as mobile device 104, device integrity verification apparatus 108, processor 212, memory 214, location detection and cropping model 488 and/or the like, for determining a location of the mobile device in the image. In this regard, example embodiments, such as with the location detection and cropping model 488 and/or respective model thereof, may predict a bounding box, or sub-portion of the image, in which the mobile device is located. If the bounding box has a predefined relationship (e.g., less than, or less than or equal to) compared to a threshold minimum ratio (e.g., 25%) of the image, example embodiments may determine the mobile device 104 was too far from the mirror or other reflective surface when the image was captured (e.g., too far to provide additional processing and predictions regarding the mobile device, with a threshold level of confidence). As such, apparatus 200, such as by operation 430, may determine the image status as "not verified," and optionally provide feedback to the user, such as indicating to hold the mobile device 104 closer to the mirror when recapturing the image.

If it is determined the bounding box has a different predefined relationship (e.g., greater than or equal to, or greater than) compared to the threshold minimum ratio of the image, example embodiments may determine the mobile device 104 was close enough to the mirror when the image was captured (e.g., close enough to provide additional processing and predictions regard the mobile device, with a threshold confidence level), such that processing may continue.

In operation 404, apparatus 200 may include means, such as mobile device 104, device integrity verification apparatus 108, processor 212, memory 214, location detection and cropping model 488 and/or the like, for cropping the image such that areas outside the bounding box are removed. The cropped image may then be reduced and resized to a predetermined size, such as 300 pixels×300 pixels. The cropped image may be processed as further described below, with reference to a cropped image as "the image," or "captured image" to avoid overcomplicating the description, even though, in some instances the image is different from the originally captured image that may be cropped according to example embodiments.

As shown by operation 405, apparatus 200 may include means, such as mobile device 104, device integrity verification apparatus 108, processor 212, memory 214, cover detection model 490 and/or the like, for determining whether the mobile device captured in the image is free of a cover(s), or includes a cover, such as a cover that impedes accurately assessing the condition of the mobile device 104. The determination may be made with a cover detection model 490 trained to detect covers on mobile devices captured in images. Example embodiments may process the images with a trained model (e.g., cover detection model 490) to predict or detect whether the user captured an image with a cover on the mobile device. Accordingly, at operation 430, example embodiments may provide feedback to the user such as indicating to recapture the image with the cover off. Example embodiments may further determine the image status as "not verified." In this regard, the user may be given the opportunity to recapture images for reprocessing.

If example embodiments determine the at least one image does not have a cover on it, further processing may continue at operation 406. As shown by operation 406, apparatus 200 may include means, such as mobile device 104, device integrity verification apparatus 108, processor 212, memory 214, and/or the like, for determining whether the at least one image includes the indicated side of the mobile device. The "indicated side" may not necessarily mean a user-indicated side, but the indicated side systematically indicated in association with a captured image, that may be generated by an app due to the user being separately prompted to capture the front and rear side of the device.

The determination may be made with a mobile device front/rear identification model 492 deployed on the mobile device 104 and/or device integrity verification apparatus 108, for example. Example embodiments may run the images through a model (e.g., mobile device front/rear identification model 492) to confirm that the image captures the side (e.g., front or rear) indicated. If it is determined the user has captured the incorrect side of the device, at operation 430, example embodiments may provide feedback to the user such as indicating to capture the indicated (e.g., front or rear) side of the device. Example embodiments may further determine the image status as "not verified." In this regard, the user may be given the opportunity to recapture the images for reprocessing.

If it is determined the images reflect the side of the device indicated (e.g., front or rear), processing may continue at operation 410. As shown by operation 410, apparatus 200 may include means, such as mobile device 104, device integrity verification apparatus 108, processor 212, memory 214, mobile device authenticity model 494, and/or the like, for determining whether the at least one image includes the mobile device associated with the mobile device identifying data object. Said differently, example embodiments determine whether the at least one image includes the mobile device from which the mobile device was captured. In some instances, users could attempt to commit fraud by utilizing their mobile device and mirror to capture an image of a different, undamaged phone. Example embodiments may utilize the mobile device authenticity model 494 to estimate angles of the mobile device relative to the reflective surface, using the image, and predict whether the device present in the image is indeed the mobile device from which the image was captured, or if the device captured in the image is another device.

As another example, example embodiments, such as with mobile device authenticity model 494, may generate a prediction of an identity of a suspected mobile device in an image based on the image. For example, the mobile device authenticity model 494 may predict the make and/or model of the mobile device, and example embodiments may compare the predicted mobile device identify to the identity indicated by the mobile device identifying data object (e.g., IMEI) to determine whether the images reflect characteristics of the device expected based on the mobile device identifying data object.

If a mobile device in an image is determined to be a different device from which the images were captured, at operation 430, feedback may optionally be provided to the user to capture images of their mobile device using the same mobile device 104 from which the device integrity verification request originated (e.g., the mobile device for which the protection plan is desired). Example embodiments may further determine the image status as "not verified."

If example embodiments determine a mobile device in an image is indeed the mobile device 104 from which the image was captured, processing may continue at operation 416. As shown by operation 416, apparatus 200 may include means, such as mobile device 104, device integrity verification apparatus 108, processor 212, memory 214, and/or the like, for determining whether the quality of the at least one image is sufficient for further processing. According to certain embodiments, image blurriness may be determined by implementation of a Laplacian variance metric.

Due to various external factors of the environment, and/or positioning of the mobile device 104 relative to the mirror, and/or the like, some images may be too blurry to further process to detect occlusions or damages (discussed in further detail below). Additionally, or alternatively, the image may be too blurry to make other predictions, including those described above, such that it may be advantageous for example embodiments to assess image quality and blurriness prior to performance of any of the operations described herein. In some examples, the image quality may be sufficient for accomplishing one task, but not another, such that various image quality verifications may be performed throughout the process illustrated by FIGS. 4A-4B.

In any event, at operation 430, feedback may be provided to the user to recapture the image and may include further guidance with regard to how to position the mobile device 104 with respect to the mirror so as to capture an image having sufficient quality for further processing. FIG. 5S provides an example interface to prompt the user to retake the photo due to a photo being too blurry. Further direction may be provided to move the mobile device 104 closer to or further from the mirror, and how to adjust the angle or orientation of the mobile device 104 relative to the mirror. Example embodiments may further determine the image status as "not verified," and the user may be given the opportunity to recapture the images for reprocessing.

If example embodiments determine that the image quality is sufficient for processing, processing may continue at operation 420. As shown by operation 420, apparatus 200 may include means, such as mobile device 104, device integrity verification apparatus 108, occlusion detection server 109, processor 212, memory 214, occlusion detection model 496, and/or the like, for determining if the at least one image is free of occlusions, or includes any objects occluding the mobile device 104 in the at least one image. To avoid overcomplicating the flowchart, operation 420 illustrates that image is either free of occlusions or is not free of occlusions. However, it will be appreciated as described herein that a degree or amount of occlusion is determined and considered in determining whether or not an image status is set to "not verified" or "verified."

For example, a user may inadvertently or intentionally cover a portion of the mobile device 104, such as a crack or other damage on a display screen, or other portion of the mobile device 104. Example embodiments may use the occlusion detection model 496 to generate a mask, as described in further detail below, to be utilized in detecting occlusions such as blocked corners (e.g., fingers covering corners of the the mobile device), and concave occlusions (e.g., fingers protruding into portions of the captured mobile device).

Small occlusions that cover the bezel or outer portion of a surface of the mobile device 104 may be permissible, but larger occlusions that obscure significant portions of a display screen or other significant portions of the device may not be permissible. If example embodiments determine that the mobile device 104 is obscured by an object, such that device integrity cannot be verified, the process may continue to operation 430, to prompt the user to retake the image without occlusions (e.g., by holding their fingers around the edge of the device only and not covering the device front or rear face), and determine the mobile image status as "not verified." Further detail regarding detection of occlusions is provided below with respect to FIG. 6, and in the section entitled "OCCLUSION DETECTION."

If no occlusions are detected, or any such occlusions are minor such that the occlusions do not impede further processing and analysis for damage or other conditions, the process may continue to operation 426. As shown in operation 426, apparatus 200 may include means, such as mobile device 104, device integrity verification apparatus 108, processor 212, memory 214, damage detection model 498, and/or the like, for determining whether the at least one image indicates the device is free of damage or includes damage. Additionally or alternatively, damage detection model 498 may determine or predict a specific type of damage present, such as cracks, water damage, dents, and/or any other damage preventing the mobile device from being insured or protected. In certain embodiments, if the model determines there is likely damage, then a separate model may predict the type of damage. In any event, example embodiments determine whether there is pre-existing damage to the mobile device 104 such that coverage in a protection plan should be denied. To avoid overcomplicating the flowchart, operation 426 illustrates that image is either free of damage or is not free of damage. However, it will be appreciated as described herein that a degree or amount of damage is considered in determining whether an image status is set to "not verified," "verified," or "inconclusive."

Further detail is provided below with regard to the damage detection model 498 utilizing training images and a model(s) to detect damage to a mobile device.

If damage is detected, at operation 430, example embodiments may provide a response to the user indicating that damage is detected and/or that a device protection plan cannot be issued. Example embodiments may further determine that the image status is "not verified."

In instances in which it is determined that there is no damage to the mobile device 104, and/or that a physical condition and/or operability parameter of the mobile device 104 is sufficient for purposes of insurability, processing may continue to operation 440. As shown in operation 440, apparatus 200 may include means, such as mobile device 104, device integrity verification apparatus 108, processor 212, memory 214, and/or the like, for determining the image status as "verified." It will be appreciated that certain operations illustrated in FIGS. 4A-4B may not be present in certain embodiments. Accordingly, apparatus 200 may be configured to require any number of the validations and/or conditions described with respect to FIGS. 4A-4B, such that an image status of "verified" may be determined if all the desired (e.g., desired, such as by a provider) verifications or conditions are performed.

In some embodiments, one or more models may be run in parallel, such as the occlusion detection model 496 and cover detection model 490. In some embodiments, the output of the image cropping model 488 may be fed into one or more of the cover detection model 490, mobile device front/rear identification model 492, mobile device authenticity model 494, occlusion detection model 496, and/or damage detection model 498 simultaneously or in any order.

According to example embodiments, an image status of "verified" may be required for multiple images, for example, a front facing image and rear facing image.

As such, in examples in which both the front face and rear face (and/or any other images) should be verified to confirm a mobile device integrity status, although not depicted in FIG. 4A to avoid overcomplicating the flowchart, operations 400, 403, 404, 405, 406, 410, 416, 420, 426, 430, and/or 440 of FIG. 4A may be repeated separately for each image required by the insurer. For example, an image indicated as capturing the front of the device may be processed according to operations 400, 403, 404, 405, 406, 410, 416, 420, 426, 430, and/or 440, and an image indicated as capturing the rear of the device may be processed according to operations 400, 403, 404, 405, 406, 410, 416, 420, 426, 430, and/or 440.

As such, as shown by operation 442 of FIG. 4B, which is a continuation of the flowchart of FIG. 4A, apparatus 200 may include means, such as mobile device 104, device integrity verification apparatus 108, processor 212, memory 214, and/or the like, for determining whether all required images (e.g., required for the purpose of determining the mobile device integrity status, for example), have an image status of "verified." The particular images (e.g., front and rear) may be preconfigured or set by the device integrity verification apparatus 108 and may relate to a provider's requirement to enroll the device in a protection plan.

For example, if an image of the front and rear of the device are required, and both images have an image status of "verified," the device integrity status may be set to "verified." However, if both an image of the front and rear of the device are required, and only one or neither images have an image status of "verified," the mobile device integrity status should remain as null or be set to "not verified," at least until both images have an image status as "verified." For example, as shown in operation 446, apparatus 200 may include means, such as mobile device 104, device integrity verification apparatus 108, processor 212, memory 214, and/or the like, for determining the device integrity status as "not verified." FIG. 5T provides an example user interface indicating that the front facing photo is approved, but the rear facing photo (e.g., back photo) may still need to be captured and processed. If either or both images are "not verified," example embodiments may prompt the user to capture or re-capture the respective images.

As shown in operation 448, it will be appreciated that example embodiments may be configured to determine a mobile device integrity status as "verified" based on a first threshold confidence level (which may be configurable), or first threshold confidence level. For example, determination of the mobile device integrity status as "verified" may not only require a status of "verified" for all required images, but may also require a minimum overall or average confidence level for all conditions assessed. A first threshold confidence level test may therefore optionally be configured, and may be configured in a variety of ways. For example, although not illustrated in FIGS. 4A-4B, in certain embodiments, a threshold confidence level of a particular prediction (e.g., condition) may be made in association with any of the predictions made in operations 400, 403, 405, 406, 410, 416, 420, and/or 426. For example, some models may be configured to provide not only the prediction, but a confidence level reflecting the confidence of the prediction being accurate. As such, a threshold confidence level may be needed for each condition to be met before proceeding to the next condition. According to certain example embodiments, an average confidence level for all conditions may need to be 95% or higher in order to set a mobile device integrity status as "verified." As another example, all conditions may need to have a 98% confidence level or higher in order to set a mobile device integrity status as "verified."

In any event, if all required images have an image status of "verified," as indicated by operation 442, and the first threshold confidence level is satisfied, as indicated by operation 448, the mobile device integrity status may be determined as "verified," as indicated by operation 450.

In this regard, apparatus 200 may include means, such as mobile device 104, device integrity verification apparatus 108, processor 212, memory 214, and/or the like, for determining the device integrity status as "verified." If the first threshold confidence level is not implemented, in certain embodiments, operation 448 may be omitted or bypassed, and a verification that all images have an image status of "verified" in operation 442, may lead to operation 450 and determining the mobile device integrity status as "verified."

According to some embodiments, if the mobile device integrity status is set to "verified," the mobile device 104 may be auto-enrolled in a protection plan, and a confirmation may be provided to the user via the user interface 216. For example, FIG. 5Y provides confirmation that the device is covered. According to some examples, the auto-enrollment and confirmation may be provided in real-time or near real-time during the session in which the coverage was requested and the images were captured by the user.

Additionally or alternatively, in response to determining a mobile device integrity status as "verified," the device may not necessarily be auto-enrolled in the protection plan, but may be forwarded, such as by mobile device 104 and/or device integrity verification apparatus 108, to internal user apparatus 110 for internal review. In such examples, embodiments may provide a message, such as that of FIGS. 5O 5P, 5Q, and/or 5X, indicating that the images have been submitted for review. Accordingly, if a provider desires to further internally review the images prior to enrolling any mobile device in a protection plan (e.g., and not provide auto-enrollment), example embodiments may nonetheless advantageously filter out images predicted not to be acceptable or verifiable, and optionally provide feedback to the user to promote efficient device enrollment.

As another example, as shown in operations 468 and 470, even if the first threshold confidence level is not satisfied at 448, but a second threshold confidence level is satisfied (e.g., 90%), example embodiments may determine the mobile device integrity status as "inconclusive," indicating further review should be performed, such as with internal user apparatus 110. Accordingly, example embodiments may be configured to "auto-enroll" devices determined to be low-risk, according to the processes of FIGS. 4A-4B, but may reserve the opportunity for the provider to further internally review images prior to enrolling any mobile device having associated images determined to be high-risk. Still further if the confidence level does not satisfy either of the first or second threshold confidence level, the mobile device integrity status may be determined as "not verified" (446) and a related request for insurance and/or the like may be rejected without further manual review. Example embodiments may therefore advantageously filter out images predicted not to be acceptable or verifiable, and optionally provide feedback to the user to promote efficient device enrollment.

In any event, it will be appreciated that example embodiments may be configured to perform any amount, or all of a required set of validation and/or verification systematically, whereas in some embodiments, a level of systematic validation and/or verification may be balanced with internal (e.g., human) review as desired by a provider, for example. Various configurations and thresholds of confidence levels for various stages of the processing may be contemplated.

Regardless of the implemented variation(s) described above, certain example embodiments may provide additional user interface displays, examples of which are described below.

In certain embodiments, the user interface display of FIG. 5N may be considered optional, and may allow entry of, confirmation of, or modification of device identifying information such as a device IMEI 550. As described above, the IMEI may be detected and/or may be populated without explicit entry by a user, such that user interface display of FIG. 5N is optional. However, in certain embodiments, the processor 212 may receive the device identifier via a user interface such as that of FIG. 5N.

It will be further appreciated that certain updates and/or statuses may be provided to the user prior to, during, or following the operations relating to determining a mobile device integrity status. For example, as illustrated in FIG. 5O, a pending review status message 556 may be displayed. As illustrated in FIG. 5P, the processor 212 may invoke a notification permission message 560, such as may be generated by the mobile device 104 in response to a mobile application of example embodiments enabling, or attempting to enable notifications on the mobile device 104. In this regard, a user may allow or decline a mobile application of example embodiments to send or push notifications. If notifications are enabled for the mobile application of example embodiments, notifications may be provided to the user during various points in the processes and operations described herein.

In certain embodiments, a user may access the mobile application of example embodiments, and see a status relating to a request. For example, review status message 564 may provide a status that the photos have been submitted and are currently being reviewed. In certain embodiments, and if notifications for the mobile application of example embodiments are enabled on a mobile device 104, notifications such as notification 570 of FIG. 5R may be displayed. Notification 570 indicates to the user that an image of the rear side of the mobile device needs to be retaken. A user may select the notification, and access the mobile application to retake an image.

Accordingly, certain embodiments may provide feedback to the user when accessing the mobile application of example embodiments, such as feedback overview 574 and reason 576 of FIG. 5S. For example, feedback overview 574 indicated the image of the rear side needs to be retaken, and reason 576 indicates the image needs to be retaken because the photo is too blurry.

In certain embodiments, such as illustrated in FIG. 5T, a message such as image approved message 580 may be displayed, such as in the area of selectable prompts 518 of FIG. 5J. As illustrated in FIG. 5T, selectable prompt 520 may be unpopulated with a message as the rear image has not yet been captured. Accordingly, a user may select to capture the image and the user interface displays of FIG. 5U and FIG. 5V may be updated to respectively provide view finder 538 and captured image 542.

Accordingly, as shown in FIG. 5W, an image approved message 580 may be displayed for one image, such as the image of the front of the device, while the captured image 542 is displayed for another image, such as the image of the rear of the device. In this regard, the selectable prompt 520 is displayed, enabling recapture or editing of the captured image 142, as the respective image is not yet approved. In certain embodiments, upon selection of selectable prompt 520, review status message 564, such as that of FIG. 5X may be displayed.

It will be appreciated that any of the user interface displays provided herein may be updated as statues, such as image statuses, and/or mobile device integrity statuses are updated and/or populated such as described with respect to FIGS. 4A-4B. In certain embodiments, a mobile device integrity status such as "not verified" or "inconclusive" may be indicated to a user as a "pending" status, and a status such as "verified," may be indicated to the user as "verified." Accordingly, while a mobile device integrity status is set to "inconclusive," the related images may be queued for manual review, and/or the like.

Still further, according to certain embodiments, if notifications are enabled on a mobile device 104, the mobile application of example embodiments may initiate a notification 590 if the mobile device integrity status is determined as "verified." As such, the user may be informed that the images are approved, and that they may enroll in, or have been enrolled in, a protection plan for their mobile device.

Occlusion Detection

FIG. 6 is a flowchart of operations for detecting occlusions, such as by occlusion detection apparatus 109, according to example embodiments. The operations of FIG. 6 may be triggered by operation 420, or in other examples may be performed as a separate process not necessarily relating to images of mobile devices. The operations of FIG. 6 may utilize or provide for an image segmentation approach to detecting occlusions.

In operation 600, apparatus 200 may include means, such as mobile device 104, device integrity verification apparatus 108, processor 212, memory 214, occlusion detection model 496 and/or the like, for generating a mask comprising a reduced number of colors relative to a number of colors in a source image. As described herein according to example embodiments, the mask may be described with reference to a mobile device in an image, but it will be appreciated that the mask generation may be performed on any object detected or present in a source image. In referencing the example of generating a mask for a mobile device (such as for the purpose of determine a mobile device integrity status), the source image may be considered the image captured by the mobile device, and the mask generated may be considered a mobile device mask.

A mask may be considered an additional image generated from processing a source image (e.g., an image of a mobile device captured by the mobile device, which may have been previously cropped according to the location detection and cropping model 488). The mask may be an image in which the number of colors is reduced, relative to the source image. For example, FIGS. 7A and 8A are examples of images of a mobile device captured by a user and comprising a wide spectrum of colors, and FIGS. 7B and 8B are respective masks generated according to example embodiments and comprising binary values (represented in the FIGS. 7B and 8B as black and white pixels). However, it will be appreciated that other configurations of colors may be selected for generating the mask. An example process for generating a mask is described in further detail below with respect to the configuration, training, and deployment of the occlusion detection model 496. It will be appreciated that separate occlusion detection models 496 and/or models thereof may be used for the front of the device and rear of the device.

According to an example embodiment, a model may return an array of values indicating whether or not a particular pixel should belong to the mask. Example embodiments may then determine based on a threshold, whether the pixel should be made white (e.g., included in the mask), or black (e.g., not included in the mask).

As shown by operation 602, apparatus 200 may include means, such as mobile device 104, device integrity verification apparatus 108, processor 212, memory 214, and/or the like, for extracting a polygonal subregion P of the mask. Accordingly, example embodiments may apply an algorithm, such as the marching square algorithm, to extract the largest polygonal subregion of the mask. In some embodiments, the largest polygonal subregion P may be assumed to be the mobile device screen when the image cropping model 488 and other relevant models and preprocessing steps have generated the source image for the occlusion detection model 496 in which the mobile device is detected and the image substantially cropped prior to generating the aforementioned mask. Accordingly, small islands (e.g., smaller outlier polygons, including black pixels appearing in otherwise largely white portions, such as those that may be caused by camera imperfections, dust/dirt and/or other minor environmental factors present on the device or mirror, and/or the like) may be removed.

As shown by operation 604, apparatus 200 may include means, such as mobile device 104, device integrity verification apparatus 108, processor 212, memory 214, and/or the like, for determining the convex hull of P. The convex hull may be calculated according to commonly known computational geometry algorithms.

Using the polygonal subregion P, along with the convex hull of P enables example embodiments to identify concave occlusions, such as the concave occlusion 700 of FIGS. 7A and 7B. A subprocess for identifying concave occlusions is provided by operations 608, 612, 616 and 620. Additionally or alternatively, example embodiments may use polygonal subregion P, along with the convex hull of P to identify blocked corners, such as the blocked corner 800 of FIGS. 8A and 8B. A subprocess for identifying blocked corners is provided by operations 630, 634, 638 and 642. According to example embodiments, both subprocesses or one of the subprocess may be implemented and performed.

As shown by operation 608, apparatus 200 may include means, such as mobile device 104, device integrity verification apparatus 108, processor 212, memory 214, and/or the like, for computing a difference between P and the convex hull. In operation 612, apparatus 200 may include means, such as mobile device 104, device integrity verification apparatus 108, processor 212, memory 214, and/or the like, for reducing or eliminating thin discrepancies at an edge of P and the convex hull. Example embodiments may reduce or eliminate the discrepancies by performing pixel erosion and expansion techniques, such as may be provided by Shapely and/or other libraries. At operation 616, apparatus 200 may include means, such as mobile device 104, device integrity verification apparatus 108, processor 212, memory 214, and/or the like, for recalculating P as the largest area of remaining regions. In this regard, P may be identified as the largest area of the remaining connected regions of P. P may therefore be considered the estimated region of the visible screen (e.g., the portion of the screen not occluded).

At operation 620, apparatus 200 may include means, such as mobile device 104, device integrity verification apparatus 108, processor 212, memory 214, and/or the like, for determining concavities as the difference between P and the convex hull. In some examples, any such concavities may be compared to a threshold for further filtering, such that very small concavities are not necessarily flagged as such, but that larger concavities which may be obtrusive to other downstream tasks (such as determining whether damage is present on the device) may be flagged such that a user is prompted to recapture an image. For example, if a particular detected concavity is larger than, or larger than or equal to a predetermined threshold size, then the area may remain predicted to be a concavity. If an area initially identified as a concavity is smaller than or equal to, or smaller than the predetermine threshold size, the area may be disregarded as a concavity. In this regard, if example embodiments predict concavities are present (and/or concavities large enough to be obtrusive to downstream tasks, as indicated by using the threshold), operation 420 may determine that the image includes an occlusion, causing example embodiments to determine an image status as "not verified," and optionally prompt the user to recapture the image.

In operation 630, apparatus 200 may include means, such as mobile device 104, device integrity verification apparatus 108, processor 212, memory 214, and/or the like, for determining a predetermined number of dominant edges of the convex hull. In the mobile device mask example, example embodiments may determine four dominant edges, and may, according to some embodiments identify the four most dominant edges. In this regard, the number of dominant edges identified may be based on the type of object for which the mask is created.

The Hough Transform feature extraction technique may be implemented to identify the dominant edges or predefined number of most dominant edges, and therefore predict where the edge of the mobile device should be visible in the image (e.g., presuming the edges are not occluded, even if they are). As shown by operation 634, apparatus 200 may include means, such as mobile device 104, device integrity verification apparatus 108, processor 212, memory 214, and/or the like, for identifying intersections of adjacent edges (identified based on their respective angles) to identify projected corner points of the mobile device in the image (which may or may not be occluded). At operation 638, apparatus 200 may include means, such as mobile device 104, device integrity verification apparatus 108, processor 212, memory 214, and/or the like, for determining the distance of each projected corner to P. For example, determining the distance may include measuring the shortest distance from the estimated corner to the closest edge or point of P.

In operation 642, apparatus 200 may include means, such as mobile device 104, device integrity verification apparatus 108, processor 212, memory 214, and/or the like, for comparing each distance to a threshold to determine if any corners are blocked. For example, if a distance is greater than, or greater than or equal to, a predetermined threshold distance, then example embodiments may determine the respective corner as blocked. In this regard, when utilized to determine a mobile device integrity status, operation 420 may determine that the image includes an occlusion, causing example embodiments to determine an image status as "not verified," and optionally prompt the user to recapture the image. If there are no computed distances that are greater than, or greater than or equal to the predetermined threshold distance, example embodiments may determine that no corners of the object are blocked in the source image.

Although not illustrated in FIG. 6, in certain example embodiments in which an image is processed for both concave occlusions and blocked corners, but none are detected, according to the operations described above, operation 420 may determine that the mobile device in the image is free of occlusions, or free of occlusions that may impact subsequent processing of the image. As such, minor occlusions not impacting subsequent processing may be permissible.

Configuration, Training, and Deployment of Models

The training of a model(s) (e.g., neural network(s)) utilized by example embodiments may occur prior to deployment of the model (e.g., prior to use by the mobile device 104 and/or device integrity verification apparatus 108 in determining whether a device qualifies for coverage in a plan, and/or occlusion detection apparatus 109 in determining whether an object in an image is occluded). According to some example embodiments, the training may be performed on an ongoing basis by receiving images and associated classifications and/or labels that have been confirmed either by example embodiments and/or human reviewers. Machine learning may be used to develop a particular pattern recognition algorithm (i.e. an algorithm that represents a particular pattern recognition problem) that may be based on statistical inference, and train the model(s) accordingly.

Example embodiments, such as with the communication interface 218, memory 214, and/or the like, receives and stores multiple types of data, including data sets, and uses the data in multiple ways, such as with processor 212. A device integrity verification apparatus 108 may receive data sets from computing devices. Data sets may be stored in memory 214 and utilized for various purposes. The data sets may therefore be used in modeling, machine learning, and artificial intelligence (AI). The machine learning and associated artificial intelligence may be performed by a device integrity verification apparatus 108, based on various modeling techniques.

For example, a set of clusters may be developed using unsupervised learning, in which the number and respective sizes of the clusters is based on calculations of similarity of features of the patterns within a previously collected training set of patterns. In another example, a classifier representing a particular categorization problem or issue may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, data set analysis includes a source-specific classifier that takes a source-specific representation of the data set received from a particular source as an input and produces an output that categorizes that input as being likely to include a relevant data reference or as being unlikely to include a relevant data reference (e.g., likely or unlikely to meet the required criteria). In some embodiments, the source-specific classifier is a trainable classifier that can be optimized as more instances of data sets for analysis are received from a particular source.

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd-based input or the like (e.g., user confirmations).

The model(s) may be initialized with a plurality of nodes. In some embodiments, existing deep learning frameworks may be used to initialize the model(s). The model(s) may be implemented as convolutional neural networks (CNN), recurrent neural networks (RNN), long short-term memory (LSTM) networks and/or the like. According to certain example embodiments, any of the models discussed herein may utilize existing or pre-trained models and may further train such models with training data specific to its respective task and/or condition described herein. For example, the device integrity verification apparatus 108 may develop templates, such as with any known or modified machine learning templating techniques. In this regard, a templated model for each respective task and/or condition described herein may be utilized by example embodiments to further train the respective model. In this regard, example embodiments may utilize templates with a domain specific data scheme and model. For example, templates design to identify certain textures in images may be utilized for cover detection and/or damage prediction. Certain templates for identifying whether a particular object is present in an image may be leveraged for mobile device presence detection.

According to certain embodiments, a CNN and associated deep learning algorithms may be particularly useful in applying machine learning to image processing, by generating multiple connected layers of perceptrons. Each layer may be connected to its neighboring layer which provides an efficient groundwork for measuring weights of a loss function and to identify patterns in the data. Accordingly, the machine learning algorithm of example embodiments, may train an associated model, such as CNN, to learn which features are significant in an image to efficiently yield accurate predictions about the image.

Using the techniques described herein, the model may then be trained to determine one or more features of an image, to generate one or more predictions associated with the methods and embodiments described herein. The training data may also be selected from a predetermined time period, such as a number of days, weeks, or months prior to the present.

In an example embodiment, labeled data sets, such as one associated with a particular task or predictions described herein, may be fed into the device integrity verification apparatus 108 to train the model(s). The model(s) may then bet trained to identify and classify subsequently received images received from a computing device, as corresponding to one or more of the labeled criteria.

In some embodiments, the AI and models described herein use a deep learning module. Deep learning is a subset of machine learning that generates models based on training data sets provided to it. Deep learning networks can be used to pull in large inputs and let the algorithm learn which inputs are relevant. In some embodiments, the training model may use unsupervised learning techniques including clustering, anomaly detection, Hebbian Learning, as well as learning latent variable models such as Expectation-maximization algorithm, method of moments (mean, covariance), and Blind signal separation techniques, which include principal component analysis, independent component analysis, non-negative matrix factorization, and singular value decomposition.

Accordingly, example embodiments may input a plurality of training images and corresponding labels into the initialized models with which to train or further train the model(s), with processor 212, to learn features via supervised or unsupervised deep learning.

In this regard, training images, some of which comprise photographed mobile devices while others do not, along with associated labels indicating various characteristics, depending on the particular model being trained, are input into the respective model. A training set may include hundreds or thousands of images, reviewed and labeled by users or data scientists (e.g., such as with internal user apparatus 110).

The model may convert an image to a matrix representation of the image and process the image alongside its confirmed label (e.g., "includes a mobile device," "does not include a mobile device") to learn features of the images that have correlations to their labels. In certain examples, an image may have multiple labels for respective conditions, such that one image may be used to train multiple different models and/or neural networks. For example, one image may be labeled "includes a mobile device," "includes a cover," and "includes damage," such that one image be used by processor 212 of example embodiments to train three separate models such as the mobile device presence model, cover detection model, and damage detection model, respectively. In certain examples, an image may be used to train one model. In this regard, training data may be collected and used in a variety of ways.

Processor 212 may train the model(s) with the training images, and adjust their respective parameters to reconfigure a matrix representation of the image through a series of deep learning iterations to capture those features or place greater weight on those features that are strong indicators of a particular label or classification. Various techniques may be utilized during training of the model, such as but not limited to fractal dimension, which is a statistical analysis that may be employed by machine learning algorithms to detect which features, and at what scale, are stronger indicators of certain predictions and/or conditions, such as those described herein. The scaling of the training images may be adjusted according to fractal dimension techniques, which may differ dependent on the particular task, or prediction to be made. For example, detecting damage such as water damage and/or cracks with a machine learning algorithm may require a higher resolution image than what may be desired for detecting whether a cover is on a device. In this regard, fractal dimension algorithms may be utilized to adjust image resolution to balance accuracy and efficiency of a model or each model.

Additional details regarding the configuration, training, and deployment of the respective model(s) for their respective tasks, conditions, and/or methods associated with example embodiments are described below. It will be further appreciated that some models may employ other classification techniques, instead of or in additional to a neural network, such as but not limited to support vector machines, decision trees, random forests, Naive Bayes Classifier, and logistic regressions.

It will be further appreciated that although processor 212 of certain embodiments may advantageously use separate models for to make separate predictions regarding the various condition described herein, certain embodiments may assess mobile device integrity status as "verified," "not verified," and/or "inconclusive," by utilizing one model (e.g., neural network). In this regard, the model (e.g., neural network) may be trained with images labeled as "verified," "not verified," and/or "inconclusive," and the model may inherently assess which images include a mobile device, which are of a front side or rear side, which includes damages or are free of damages, to determine which images should be predicted as verified," "not verified," and/or "inconclusive." However, utilizing a single model may require more training data to produce accurate or meaningful results in comparison to utilizing separate models for at least some conditions described herein. At least one additional advantage of using separate models, and optionally generating respective confidence levels, includes enabling the provision of specific feedback to the user capturing the image, such as "please move the device closer to the mirror," "please remove your device cover," "please retake the photo while keeping your fingers on the edge of the device," and/or the like. Such feedback may result in improved or increased automated verification rates, while reducing the need for inconclusive statuses or manual review.

Mobile Device Presence Model

The mobile device presence model 486 enables example embodiments to automatically predict (e.g., without human review) whether a newly received image includes a mobile device, or no mobile device. Processor 212 of example embodiments, such as apparatus 200, may utilize an existing model such as Torchvision's implementation of Squeezenet, and use weights established by a visual database such as ImageNet, to pre-train the model. Example embodiments may further train the model for the mobile device presence detection task by inputting into the model training images and corresponding labels such as "includes device," and "does not include a device." In this regard, the model (e.g., neural network) may be trained with at least two sets of images, such as a first set of training images that include mobile devices, and a second set of training images that do not include mobile devices.

Various deep learning methodologies may then be used according to example embodiments to process the training images and corresponding labels through the model and train the model to generate predictions on subsequently received images. According to example embodiments, once deployed, the trained mobile device presence model 486 may generate an indicator of the likelihood of an image including a mobile device. For example, the indicator may be a number from 0 to 1, where a number closer to 1 indicates that a mobile device is likely present. As such, the indicator may reflect a confidence level of the prediction.

Accordingly, processor 212 of example embodiments may process a subject image with at least one model, trained with a plurality of training images that are each labeled as either including a mobile device or excluding a mobile device, to determine whether the subject image includes a mobile device.

In the context of determining a mobile device integrity status, or image status, example embodiments may utilize the trained mobile device presence model 486 in performing operation 400. Example embodiments may further implement a configurable or predefined quantifiable requirement indicating a confidence level that must be satisfied for the prediction to be accepted (e.g., and not requiring further internal review).

Location Detection and Cropping Model

The location detection and cropping model 488 enables example embodiments to predict where in an image a particular object, such as mobile device, is located, and further determine if the object was too far from the image capture sensor (220), or, in the case of the reflective surface example, too far from the mirror when the image was captured. The location detection and cropping model 488 further enables cropping of an image accordingly. Example embodiments may utilize existing frameworks to further train a pre-trained model. For example, according to example embodiments, Tensorflow's object detection framework may be utilized to train a network with a Mobilenet backend pre-trained on the COCO (Collaborative Computing) dataset.

Training images in which reviewers have traced the outlines of a mobile device present in the image, may be input, along with their respective labels that are the traced outlines, into the model for further training. As such, the model may be trained to predict a bounding box defined as (xmin, xmax, ymin, ymax), relative to the image, in which the object, such as a mobile device, is likely located. The model may be further trained to generate an indicator, such as a number between 0 and 1, indicating the bounding box likely contains a mobile device. For example, a number closer to 1 may indicate that the bounding box likely contains a mobile device, relative to a number closer to 0. As such, the output of the location detection and cropping model 488 may indicate a confidence level of the bounding box accurately capturing the location of the object, such as the mobile device, in the image.

Accordingly, as described with respect to operation 403, the location detection and cropping model 488, once deployed, may make predictions regarding the proximity of the mobile device to the mirror at the time the image was captured, enabling feedback to be optionally provided to the user.

According to certain embodiments, canny edge detection algorithms may also be used to estimate a bounding box of a mobile device in an image. For example, canny edge detection may utilize a Gaussian filter to smooth an image, determine intensity gradients, and predict the strongest edges in the image. The bounding box may then be estimated accordingly.

Processor 212 of example embodiments may process a subject image with at least one model, trained with a plurality of training images that are each associated with a bounding box indicating a location of a mobile device in the image, to determine a location of a mobile device in the subject image. Example embodiments may further determine a confidence level of accurately indicating the location of a mobile device in the image.

In this regard, if a confidence level does not satisfy a threshold amount, an image may remain as "not verified," and may therefore be subject to further manual review. Additionally or alternatively, as described with respect to operation 404, and if a certain threshold confidence level is met, the image may be cropped according to the predicted bounding box. It will be appreciated that in certain example embodiments, satisfaction of the threshold confidence level may be optional. In embodiments not utilizing a threshold confidence level, any or all images for which a bounding box may be calculated may be cropped accordingly.

Cover Detection Model

The cover detection model 490 enables example embodiments to predict whether a user has captured an image of a mobile device with the cover on. An existing model may be utilized and further trained, such as with images and respective labels indicating whether or not the image contains a mobile device with a cover on it (e.g., a mobile device with a case). Example embodiments may utilize an existing image processing framework, and further train the model with the training images and labels. As such, example embodiments may train the model with processor 212 to place greater weight on certain features, such as those relating to texture, that are strong indicators of whether or not a mobile device in the captured image has a cover on it. In this regard, texture may be determined to be a strong indicator, learned by the model, of whether or not a mobile device in an image includes a cover. Processor 212 of example embodiments may therefore process the subject image of a mobile device with at least one model, trained with a plurality of training images of mobile devices labeled as including a cover on the respective mobile device or excluding a cover on the respective mobile device, to determine whether the subject image includes a cover on the subject mobile device. Accordingly, a deployed cover detection model 490 may enable processor 212 of apparatus 200 to provide predictions relating to newly captured images, and optionally provide feedback to the user to remove a cover and recapture an image, as provided in operation 405.

Mobile Device Front/Rear Identification Model

The mobile device front/rear identification model 492 enables example embodiments to predict whether a user has captured an image of the front or rear of their device. An existing model may be utilized and further trained, such as with images and respective labels indicating whether the image provides a view of the front of the device or rear of the device. Example embodiments may utilize an existing image processing framework, and further train the model with the training images and labels. As such, example embodiments may train the model to identify key features that may be unique to one side of the device. For example, the variation in pixels associated with a display screen surrounded by a bezel may indicate a front of the device.

In this regard, processor 212 of apparatus 200 may process a subject image of a mobile device with at least one trained model, trained with a plurality of training images of mobile devices, each training image labeled as including a front side of the respective mobile device or including a rear side of the respective mobile device, to determine whether the subject image includes a front side or rear side of the subject mobile device.

Accordingly, a mobile device front/rear identification model 490 may provide predictions relating to newly captured images and whether the user has accurately captured the front and/or rear of a mobile device, and optionally provide feedback to the user to capture the indicated side of the device, as provided in operation 406. Additionally or alternatively, example embodiments may determine whether a particular image is an image of the front or rear of the device based on data identifying which of a front or rear camera the image is captured (e.g., which of a front or rear facing image capture 220 is used to capture an image).

According to some example embodiments, the cover detection model 490 and mobile device front/rear identification model 492 may be implemented as a single model. For example, since it may be advantageous to reject or filter out any images including a cover, the training images input into the model may include labels of "cover," "front," or "rear," such that the "cover" label should be used in any training image including a cover. As such, example embodiments may reject, or set the image status to "not verified," in any scenario in which an image is predicted to include a cover.

Mobile Device Authenticity Model

The mobile device authenticity model 494 enables example embodiments to predict whether an image includes the same mobile device with which the image was captured. An existing model may be utilized and further trained, such as by processor 212 and with images and respective labels indicating whether the image includes the mobile device from which the image was captured (e.g., "same device,") or another device (e.g., "different device). For example, an internal user or data scientist may use a mobile device to capture images of both the mobile device capturing the image, and other devices, and label the images accordingly. Example embodiments may therefore train the model with the training images and labels such that example embodiments learn to detect edges of the mobile device in the image and measure the edges to predict or estimate an angle at which the mobile device was held relative to a mirror.

As such, processor 212 of example embodiments may process a subject image of a mobile device with at least one model, trained with a plurality of training images of mobile devices, each training image labeled as having been captured by the respective mobile device included in the image, or captured by a different device than the respective mobile device included in the image, to determine whether the subject mobile device included in the subject image was captured by the subject mobile device or a different device.

In certain embodiments, this process of determining mobile device authenticity may further utilize a bounding box drawn by a user during labeling of training images. In any event, based on the angle, further predictions may be made indicating whether or not the mobile device in an image is the same device with which the image was captured.

Occlusion Detection Model

As introduced above, a mask, such as the mask used to detect occlusions, may be generated by a trained model. In this regard, example embodiments may utilize an existing model, such as UNet architecture, and train the model from scratch with manually created masks. In this regard, data scientists or other internal users may review images, and manually trace or input a shape in the form of a mask (e.g., a shape reflecting the example masks of FIGS. 7B and 8B), including the exposed areas of the object of interest (e.g., mobile device), but not occluding objects (e.g., fingers) and/or objects visible in the background. In this regard, each pixel of the training image (which may be reduced to a predetermined size, such as 300 pixels by 300 pixels, and/or cropped) may be labeled such that each pixel has an associated indicator as to whether or not it belongs to the mask. The model may then be trained on the images and labels.

Accordingly, the deployed and trained model may take an inputted image (e.g., a reduced and cropped image), and process the image with processor 212 to provide a prediction of the mask, in the form of a predetermined sized array (e.g., 300×300) of indicators indicating whether or not a respective pixel belongs to the mask or not. For example, the array may comprise numerical values ranging from 0 to 1, where values close to 1 correspond to pixels that likely belong to the mobile device (and are therefore considered as included in the mask), relative to values closer to 0. Accordingly, the mask predicted by the model may be utilized by example embodiments, such as described with respect to FIG. 6, to determine whether occlusions of the mobile device 104 are present in an image. According to certain example embodiments, a model and training set may be used for masks of images of the front of the device, and a separate model and training set may be used for mask of images of the rear of the device.

Using a model (e.g., neural network) to determine the masks provide may advantages that may not be provided by other image processing techniques. A model is useful in making contextual predictions often made by humans, that traditional computer algorithms cannot. For example, colors in the screen are not uniform, and some of the same colors may appear in pixels outside of the device in the image. A model such as a neural network can make such distinctions, but a traditional color detection or other image processing algorithm may not accurately distinguish pixels apart of the image and not apart of the image that otherwise have the same or similar color.

Damage Detection Model

The damage detection model 498 enables example embodiments to predict whether a mobile device captured in an image is damaged (e.g., damaged to the extent that mobile device integrity status should be set to "not verified," such as because the damaged device would not qualify for coverage in a device protection plan). An existing model may be utilized and further trained, by processor 212, such as with images and respective labels indicating whether or not the image contains a mobile device with damage, such as but not limited to cracks, water damage, dents, scratches, and/or any other damage preventing the mobile device from being insured or protected. According to example embodiments, a special user interface tool may be utilized by reviewers or data scientists to zoom in on images of mobile devices to determine whether cracks or other damages are present, and label the training image accordingly. In certain embodiments, a binary label such as "damaged" or "not damaged" may be applied to a training image. As another example, a reviewer may score a level of damage, such that minor or seemingly insignificant cracks receive a relatively lower score in comparison to an image indicating a more significant crack that may impact functionality. Any variation or scoring of the damage labeling may be contemplated. As yet another example, certain damage may be specifically labeled as "crack," "water damage," or any other type of damage that may impact the insurability of a mobile device.

In certain embodiments, a first label of a training image of mobile device may indicate "damaged," and a second label indicates the type of damage. In this regard, one model may be trained to predict whether damage is present or not present. A separate model and/or model(s) may predict, if damage is predicted to be present, the specific type of damage identified, such as a crack, water damage, or dent. For example, one model may be trained solely to detect water damage based on training images of water damage, and the same logic may be applied to other types of damage and any other visibly detectable condition of the device.

Example embodiments may utilize an existing image processing framework, and further train the model with the training images and labels. As such, example embodiments may train the model to place greater weight on certain features, such as those relating to texture and/or color variation, that are strong indicators of damage and/or particular types of damage.

In this regard, apparatus 200 may include means, such as processor 212, to process the subject image of the mobile device with at least one model, trained with a plurality of training images of mobile devices, each training image labeled with a damage rating, to calculate a damage rating of the subject mobile device in the subject image. In this regard, a damage rating may include "no damage," "minor damage," "extensive damage" and/or the like. In certain embodiments, the damage rating may include a quantifiable rating such as on a scale of 1-10, where 1 indicates no detected damage, and 10 indicates extensive or significant damage. A deployed damage detection model(s) 498 may therefore provide predictions as to whether or not a device is damaged, the extent of the damage, and/or the type of damage.

In scenarios in which damage is detected, and optionally dependent on the type and/or extent of the damage, the image status may be "not verified," resulting in a mobile device integrity status of "not verified" or "inconclusive." As another example, a quantitative damage score may be generated.

Additionally or alternatively, it will be appreciated that separate damage detection models may be configured, trained and deployed for each of the front, rear, and/or bezel of a mobile device. The bezel may be recognized as a part of the device so that damages to the bezel may also be detected.

CONCLUSION

As set forth herein, example embodiments of the disclosure provide technical advantages over alternative implementations. Example embodiments may be implemented to expend fewer processing resources that may otherwise be expended to submit every image captured by a user to a server for storage, potential review, and further processing.

In this regard, certain operations, such as any of the operations of FIGS. 3, 4A-4B and/or 6 may be executed on the mobile device 104, while other operations may be performed on the device integrity apparatus 108 and/or occlusion detection apparatus 109. As such, example embodiments may provide resource efficiencies by strategically balancing such operations. For example, some initial image processing operations may be performed on the mobile device 104 before the image is transmitted to device integrity apparatus 108 and/or occlusion detection apparatus 109. As such, certain images may be filtered out on the mobile device 104 prior to being processed by other, potentially more resource intensive processes.

For example, some embodiments may employ models such as neural networks configured to operate on a mobile device, such as mobile device 104. For example, TensorFlow Lite, and/or other frameworks designed to be deployed on a mobile device may be utilized according to example embodiments.

As such, for example, example embodiments may provide real-time, on-device validation in certain scenarios, such as when a high confidence level of an image status or mobile device integrity status is determined. Otherwise, an image and/or device integrity verification request may be transmitted to the device integrity apparatus 108 for an agent to review. On the server-side, similar algorithms as implemented on the device-side may be used to expedite image review and/or treat the input from reviews as a means of further calibrating the algorithms and/or training the models.

FIGS. 3, 4A-4B, and 6 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 214) storing instructions executable by a processor in the computing device (for example, by the processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, a mobile device support apparatus 102, a mobile device 104 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a mobile device 104 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:
1. A method comprising:
receiving at least one image of a mobile device captured by one or more image sensors of the mobile device via a reflective surface;
with at least one trained model, processing the at least one image to identify one or more concavities, wherein each of the one or more concavities re identified by:
determining a Polygonal subregion P and a convex hull of P; and
determining the one or more concavities as a difference between P and the convex hull of P;
for each of the one or more concavities identified in the at least one image, compare the one or more concavities to a concavity threshold;
in response to determining the one or more concavities is larger than the concavity threshold, causing display on the mobile device of a prompt to capture one or more images without the one or more concavities; and in response to determining the one or more concavities is smaller than, or smaller than or equal to the concavity threshold, disregarding the one or more concavities and proceeding to process the one or more images to determine a mobile device integrity status.

2. The method of claim 1, further comprising:

outputting the mobile device integrity status.

3. The method of claim 2, wherein processing the one or more images to determine the mobile device integrity status comprises:

utilizing the at least one trained model to determine whether there is damage to the mobile device; and in response to determining there is damage to the mobile device, determining the mobile device integrity status as not verified.

4. The method of claim 2, wherein processing the one or more images to determine the mobile device integrity status comprises:

determining an angle of the mobile device relative to the reflective surface when the one or more images were captured; and determining, based on the angle, that the one or more images include a different mobile device than the mobile device associated with a mobile device identifying data object received from the mobile device.

5. The method of claim 4, further comprising:

in response to determining, based on the angle, that the at least one image captures a different mobile device,
(a) causing display on the mobile device of a message instructing a user to recapture the mobile device; and
(b) determining that the mobile device integrity status is not verified.

6. The method of claim 2, wherein processing the one or more images to determine the mobile device integrity status comprises:

determining whether the at least one image includes the mobile device associated with the mobile device identifying data object received from the mobile device.

7. The method of claim 6, wherein determining whether the one or more images includes the mobile device comprises:

identifying at least one suspected mobile device in the at least one image;

generating a prediction of an identity of the at least one suspected mobile device, and comparing a mobile device identifying data object received from the mobile device to the prediction of the identity of the at least one suspected mobile device to determine whether the at least one suspected mobile device is the mobile device, and in an instance in which the at least one suspected mobile device is determined to be the mobile device, determining the mobile device integrity status as verified.

8. The method of claim 2, further comprising:

determining the mobile device integrity status as inconclusive, and in response thereto, transmitting the one or more images to an internal user apparatus for internal review.

9. The method of claim 2, wherein processing the one or more images to determine mobile device integrity status comprises:

determining a location within the one or more images, wherein the location is defined as a bounding box; and in an instance in which the bounding box has a first predefined relationship with a threshold ratio of the one or more images, causing display on the mobile device of a message indicating to move the mobile device closer to the reflective surface.

10. The method of claim 9, further comprising:

in an instance in which the bounding box has a second predefined relationship with the threshold ratio of the one or more images, cropping the one or more images according to the bounding box.

11. An apparatus comprising one or more processors and at least one memory including computer program code, the at least one memory and the computer program code configured to, with the one or more processors, cause the apparatus to at least:

receive at least one image of a mobile device captured by one or more image sensors of the mobile device via a reflective surface;

with at least one trained model, process the at least one image to identify one or more concavities, wherein each of the one or more concavities are identified by:
determining a polygonal subregion P and a convex hull of P; and
determining the one or more concavities as a difference between P and the convex hull of P;

for each of the one or more concavities identified in the at least one image, compare the one or more concavities to a concavity threshold;

in response to determining the one or more concavities is larger than the concavity threshold, cause display on the mobile device of a prompt to capture one or more images without the one or more concavities; and in response to determining the one or more concavities is smaller than, or smaller than or equal to the concavity threshold, disregard the one or more concavities and proceed to process the one or more images to determine a mobile integrity status.

12. The apparatus of claim 11, wherein the at least one memory and the computer program code are further configured to, with the one or more processors, cause the apparatus to at least:

output the mobile device integrity status.

13. The apparatus of claim 12, wherein processing the one or more images to determine the mobile device integrity status comprises:

utilizing the at least one trained model to determine whether there is damage to the mobile device; and in response to determining there is damage to the mobile device, determining the mobile device integrity status as not verified.

14. The apparatus of claim 12, wherein processing the one or more images to determine the mobile device integrity status comprises:

determining an angle of the mobile device relative to the reflective surface when the one or more images were captured; and determining, based on the angle, that the one or more images include a different mobile device than the mobile device associated with a mobile device identifying data object received from the mobile device.

15. The apparatus of claim 14, wherein the at least one memory and the computer program code are further configured to, with the one or more processors, cause the apparatus to at least:

in response to determining, based on the angle, that the at least one image captures a different mobile device,
(a) cause display on the mobile device of a message instructing a user to recapture the mobile device; and (b) determine that the mobile device integrity status is not verified.

16. The apparatus of claim 12, wherein processing the one or more images to determine the mobile device integrity status comprises:
determine whether the at least one image includes the mobile device associated with the mobile device identifying data object received from the mobile device.

17. The apparatus of claim 16, wherein determining whether the one or more images includes the mobile device comprises:
identifying at least one suspected mobile device in the at least one image;
generating a prediction of an identity of the at least one suspected mobile device, and comparing a mobile device identifying data object received from the mobile device to the prediction of the identity of the at least one suspected mobile device to determine whether the at least one suspected mobile device is the mobile device, and
in an instance in which the at least one suspected mobile device is determined to be the mobile device, determining the mobile device integrity status as verified.

18. The apparatus of claim 12, wherein the at least one memory and the computer program code are further configured to, with the one or more processors, cause the apparatus to at least:
determining the mobile device integrity status as inconclusive, and in response thereto, transmitting the one or more images to an internal user apparatus for internal review.

19. The apparatus of claim 12, wherein processing the one or more images to determine mobile device integrity status comprises:
determining a location within the one or more images, wherein the location is defined as a bounding box; and
in an instance in which the bounding box has a first predefined relationship with a threshold ratio of the one or more images, causing display on the mobile device of a message indicating to move the mobile device closer to the reflective surface.

20. The apparatus of claim 19, wherein the at least one memory and the computer program code are further configured to, with the one or more processors, cause the apparatus to at least:
in an instance in which the bounding box has a second predefined relationship with the threshold ratio of the one or more images, cropping the one or more images according to the bounding box.

21. A computer program product comprising at least one non-transitory computer-readable storage medium having computer-executable program code instructions stored therein, the computer-executable program code instructions comprising program code instructions to:
receive at least one image of a mobile device captured by one or more image sensors of the mobile device via a reflective surface;
with at least one trained model, process the at least one image to identify one or more concavities, wherein each of the one or more concavities are identified by:
determining a polygonal subregion P and a convex hull of P; and
determining the one or more concavities as a difference between P and the convex hull of P;
for each of the one or more concavities identified in the at least one image, compare the one or more concavities to a concavity threshold;
in response to determining the one or more concavities is larger than the concavity threshold, cause display on the mobile device of a prompt to capture one or more images without the one or more concavities; and
in response to determining the one or more concavities is smaller than, or smaller than or equal to the concavity threshold, disregard the one or more concavities and proceed to process the one or more images to determine a mobile device integrity status.

22. The computer program product of claim 21, wherein the computer-executable program code instructions further comprise program code instructions to:
output the mobile device integrity status.

23. The computer program product of claim 22, wherein processing the one or more images to determine the mobile device integrity status comprises:
utilizing the at least one trained model to determine whether there is damage to the mobile device; and
in response to determining there is damage to the mobile device, determining the mobile device integrity status as not verified.

24. The computer program product of claim 22, wherein processing the one or more images to determine the mobile device integrity status comprises:
determining an angle of the mobile device relative to the reflective surface when the one or more images were captured; and
determining, based on the angle, that the one or more images include a different mobile device than the mobile device associated with a mobile device identifying data object received from the mobile device.

25. The computer program product of claim 24, the computer-executable program code instructions further comprise program code instructions to:
in response to determining, based on the angle, that the at least one image captures a different mobile device,
(a) cause display on the mobile device of a message instructing a user to recapture the mobile device; and
(b) determine that the mobile device integrity status is not verified.

26. The computer program product of claim 22, wherein processing the one or more images to determine the mobile device integrity status comprises:
determine whether the at least one image includes the mobile device associated with the mobile device identifying data object received from the mobile device.

27. The computer program product of claim 26, wherein determining whether the one or more images includes the mobile device comprises:
Identifying at least one suspected mobile device in the at least one image;
generating a prediction of an identity of the at least one suspected mobile device, and comparing a mobile device identifying data object received from the mobile device to the prediction of the identity of the at least one suspected mobile device to determine whether the at least one suspected mobile device is the mobile device, and
in an instance in which the at least one suspected mobile device is determined to be the mobile device, determining the mobile device integrity status as verified.

28. The computer program product of claim 22, the computer-executable program code instructions further comprise program code instructions to:

determining the mobile device integrity status as inconclusive, and in response thereto, transmitting the one or more images to an internal user apparatus for internal review.

29. The computer program product of claim 22, wherein processing the one or more images to determine mobile device integrity status comprises:
   determining a location within the one or more images, wherein the location is defined as a bounding box; and
   in an instance in which the bounding box has a first predefined relationship with a threshold ratio of the one or more images, causing display on the mobile device of a message indicating to move the mobile device closer to the reflective surface.

30. The computer program product of claim 29, the computer-executable program code instructions further comprise program code instructions to:
   in an instance in which the bounding box has a second predefined relationship with the threshold ratio of the one or more images, cropping the one or more images according to the bounding box.

\* \* \* \* \*